US012669679B2

(12) United States Patent
Huang

(10) Patent No.: US 12,669,679 B2
(45) Date of Patent: Jun. 30, 2026

(54) OPTICAL LENS AND ELECTRONIC DEVICE

(71) Applicant: TRIPLE WIN TECHNOLOGY (SHENZHEN) CO. LTD., Shenzhen (CN)

(72) Inventor: Gwo-Yan Huang, New Taipei (TW)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 354 days.

(21) Appl. No.: 18/534,351

(22) Filed: Dec. 8, 2023

(65) Prior Publication Data

US 2024/0345363 A1 Oct. 17, 2024

(30) Foreign Application Priority Data

Apr. 13, 2023 (CN) .......................... 202310444388.3

(51) Int. Cl.
*G02B 9/14* (2006.01)
*G02B 13/00* (2006.01)

(52) U.S. Cl.
CPC ........... *G02B 9/14* (2013.01); *G02B 13/0035* (2013.01)

(58) Field of Classification Search
CPC .............................. G02B 9/14; G02B 13/0035
USPC .......................................................... 359/716
See application file for complete search history.

(56) References Cited

U.S. PATENT DOCUMENTS

| | | | | |
|---|---|---|---|---|
| 2015/0146307 A1* | 5/2015 | Kubota | .................... | G02B 9/60 |
| | | | | 359/714 |
| 2015/0160435 A1* | 6/2015 | Chen | .................. | G02B 13/0045 |
| | | | | 359/756 |
| 2015/0338607 A1* | 11/2015 | Liao | ........................ | G02B 13/18 |
| | | | | 359/713 |
| 2016/0116715 A1* | 4/2016 | Ota | .................... | G02B 13/0045 |
| | | | | 359/757 |
| 2016/0341934 A1* | 11/2016 | Mercado | ............ | G02B 13/0045 |
| 2018/0210172 A1* | 7/2018 | Kubota | .................... | G02B 9/62 |

FOREIGN PATENT DOCUMENTS

CN        113917663 A        1/2022

* cited by examiner

*Primary Examiner* — Sharrief I Broome
(74) *Attorney, Agent, or Firm* — ScienBiziP, P.C.

(57) ABSTRACT

An optical lens with a first lens, a second lens, and a third lens sequentially arranged along an optical axis from an object side to an image side. At least part of an object surface of the first lens is a convex surface, an image surface of the first lens is a convex surface. At least part of an object surface of the second lens is a concave surface, an image surface of the second lens is a convex surface. At least part of an object surface of the third lens is a convex surface, an image surface of the third lens is a concave surface. An aperture value of the optical lens satisfies 1.0≤Fno≤1.3. An electronic device incorporating the optical lens is further disclosed in the present disclosure.

18 Claims, 14 Drawing Sheets

100a

Distance from the center of the image plane
to the corner of the image plane (mm)

Field curvature

Distortion

✦ 0.9200
✳ 0.9400
✸ 0.9600

IMA:0.000mm

IMA:0.210mm

IMA:0.420mm

IMA:0.630mm

IMA:0.840mm

IMA:1.050mm

100b

——— Sagittal   -------- Tangential

Field curvature

Shifting (mm)

Distortion

Percentage (%)

0.9200
0.9400
0.9600

IMA:0.000mm

IMA:0.210mm

IMA:0.420mm

IMA:0.630mm

IMA:0.840mm

IMA:1.050mm

100c

Field curvature

Shifting (mm)

Distortion

Percentage (%)

* 0.9200
* 0.9400
* 0.9600

IMA:0.000mm

IMA:0.210mm

IMA:0.420mm

IMA:0.630mm

IMA:0.840mm

IMA:1.050mm

100(100a,100b,100c)

200

210

OPTICAL LENS AND ELECTRONIC DEVICE

FIELD

The present disclosure generally relates to imaging module field, particularly relates to an optical lens and an electronic device including the optical lens.

BACKGROUND

With rapid development and increasing popularity of 3D sensing technology, infrared camera modules have been increasingly used for advanced image analysis in smartphones or electronic devices having functions such as augmented reality and virtual reality in recent years. The infrared camera modules can further collocate with optical lens including multiple lenses to improve resolution, which enriches disclosure scenarios of the 3D sensing technology, and bringing experience with both entertainment and practicality to smart products. Although the optical lens can improve imaging effect, achieving such optical lens with a large aperture value is challenging. An optical lens with large aperture value causes insufficient of incident light, which slows down a reaction speed of the optical lens during imaging. A transmission power at a transmitting end needs to be increased when the incident light at a receiving end of the infrared camera modules is insufficient, which ultimately leads to an increase in system power consumption.

DETAILED DESCRIPTION

Figure 1:
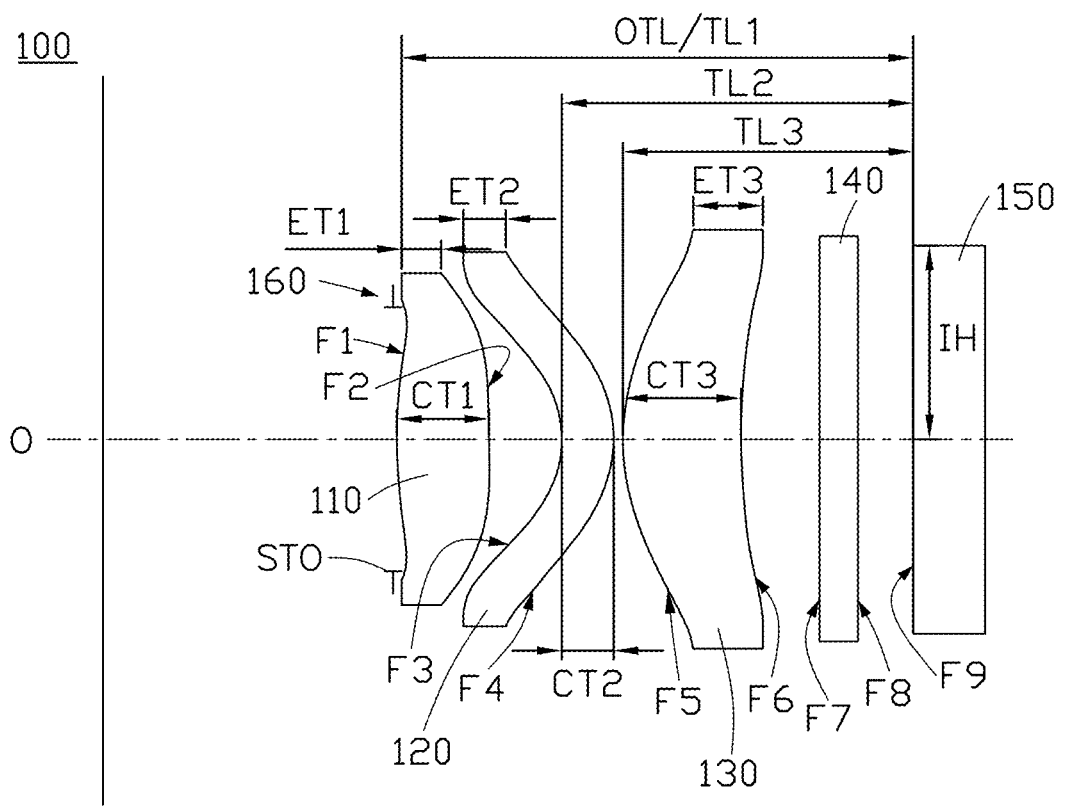
FIG. 1 is an illustration of an optical lens according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "comprising," when utilized, means "including, but not necessarily limited to"; it specifically indicates open-ended inclusion or membership in the so-described combination, group, series, and the like.

"Above" means one layer is located on top of another layer. In one example, it means one layer is situated directly on top of another layer. In another example, it means one layer is situated over the second layer directly or indirectly with more layers or spacers in between.

When a feature or element is herein referred to as being "on" another feature or element, it can be directly on the other feature or element or intervening features and/or elements may also be present. It will also be understood that, when a feature or element is referred to as being "connected", "attached" or "coupled" to another feature or element, it can be directly connected, attached or coupled to the other feature or element or an intervening features or elements may be present.

The present disclosure provides an optical lens. As shown in FIG. 1, the optical lens 100 includes three lenses. For convenience of description, a left side of the optical lens 100 as shown in FIG. 1 is defined as an object side and a right side of the optical lens 100 as shown in FIG. 1 is defined as an image side. Defining surfaces of the three lenses facing the object side as object surfaces and defining surfaces of the three lenses facing the image side as image surfaces. The optical lens 100 with an optical axis O includes a first lens 110, a second lens 120, and a third lens 130 from the object side to the image side along the optical axis O. The first lens 110 has a positive focal power, and at least part of an object surface F1 of the first lens 110 is a convex surface, while an image surface F2 of the first lens 110 is a convex surface. The second lens 120 has a negative focal power, and at least part of an object surface F3 of the second lens 120 is a concave surface, while an image surface F4 of the second lens 120 is a convex surface. The third lens 130 has a positive focal power, and at least part of an object surface F5 of the third lens 130 is a convex surface, while an image surface F6 of the third lens 130 is a concave surface. In this embodiment, central areas of the object surface F1 and the object surface F5 are convex surfaces, while a central area of the object surface F3 is a concave surface, wherein the central areas intersect with the optical axis O. The optical focal power is defined as a difference between a light convergence of the image side and a light convergence of the object side, which can represent ability of the first lens 110, the second lens 120, and the third lens 130 deflecting light. A convex lens has a positive focal power, while a concave lens has s negative focal power. Moreover, an aperture value (F-number, Fno) of the optical lens 100 satisfies the condition of $1.0 \leq Fno \leq 1.3$, wherein the optical lens 100 has a characteristic of a large aperture.

In at least one embodiment, an aperture 160 (such as an aperture stop) may be included in front of the object surface F1 of the first lens 110 to adjust light quality of incident beams. The aperture 160 includes a hole (not shown) to limit a size of the incident beam, wherein a size and a position of the hole play a decisive role in a clarity, an accuracy, and a brightness of the first lens 110 imaging.

In at least one embodiment, an image sensor 150 may be included after the image surface F6 of the third lens 130. The image sensor 150 is configured to convert light signal (that is, light transmit through the first lens 110, the second lens 120, and the third lens 130 for imaging) from the third lens 130 into an electrical signal. The image sensor 150 is a semiconductor chip with a surface including hundreds to millions of photodiodes (not shown). The photodiodes can generate charges when illuminated by light. The charges can be converted into digital signals by an analog-to-digital converter chip (not shown). The image sensor 150 can be a charge coupled device (CCD) or a complementary metal oxide semiconductor (CMOS) device.

In at least one embodiment, a filter 140 may be included between the third lens 130 and the image sensor 150 to filter part of the incident light with wavelength outside a target range. The filter 140 such as an infrared light transparent film, which is used to filter light except infrared light and ensure the infrared light can transmit.

In at least one embodiment, the first lens 110, the second lens 120, and the third lens 130 can be plastic, glass, or any other material that can meet needs of lens. Lenses made of plastic and glass have different advantages and disadvantages. Lenses made of plastic are usually used in mobile phone cameras, as most of the lenses made of plastic are thermoplastic, making them easy to manufacture and reducing costs. Lenses made of glass are usually used in car lenses or other lenses that require high temperature and pollution resistance. A production method of the lenses made of glass is more complex than that of the lenses made of plastic, and a cost of the lenses made of glass is higher than that of the lenses made of plastic. Whether each of the first lens 110, the second lens 120, and the third lens 130 is made of plastic or glass, surfaces of the first lens 110, the second lens 120, and the third lens 130 need to be covered with an optical thin film (not shown in the figure) to get better imaging results. In this embodiment, the first lens 110, the second lens 120, and the third lens 130 are covered by anti-reflection (AR) films, while the filter 140 is covered by an infrared ray pass (IR pass) film. Both the AR films and the IR pass film are configured to increase a transmittance of infrared light.

In this embodiment, the first lens 110, the second lens 120, and the third lens 130 are aspherical lenses and are axisymmetric structures about the optical axis O. Aspheric lenses play a very important role in optical systems, mainly used to focus incident light and improve numerical apertures of the lenses (the first lens 110, the second lens 120, and the third lens 130). The aspherical lenses can also reduce a number of optical components in the optical systems. For example, one or two aspherical lenses can be used instead of five or six spherical lenses, which can still achieve a same or even better optical effects, thereby reducing design and production costs and a size of the lens. In addition, the aspherical lens can also correct spherical aberration, thereby reducing an aberration of the optical system and ultimately improving quality of the optical system.

A curvature radius of surfaces of each of the aspherical lens changes from a center (position of the optical axis O) of the aspherical lens to an edge of the aspherical lens. That is, each of the surfaces are composed of curves formed by aspheric coefficients. An aspheric formula of the first lens 110, the second lens 120, and the third lens 130 satisfy:

$$Z = \frac{cr^2}{1 + \sqrt{1 - (1 + K)c^2 r^2}} + A_4 r^4 + A_6 r^6 + \tag{1}$$
$$A_8 r^8 + A_{10} r^{10} + A_{12} r^{12} + A_{14} r^{14} + A_{16} r^{16} + A_{18} r^{18} + A_{20} r^{20}$$

The optical axis O and an aspherical surface intersect at an intersection point, and Z presents a distance between the intersection point and any point on the aspherical surface along the optical axis O direction. A vertical distance from any point on the aspherical surface to the optical axis O is r, a curvature (reciprocal of a curvature radius) of the intersection point is c, a cone constant is K, the i-th (i=4, 6, 8, 10, 12, 14, 16, 18, 20) correction factor of the aspheric surfaces is $A_i$. Aspherical surfaces of each lens in the optical lens 100 can be represented by formula (1) in this embodiment. Other aspherical formulas can be used in other embodiments.

In this embodiment, a focal length of the first lens 110 is f1, a synthetic focal length of the second lens 120 and the third lens 130 is f23, and the following conditions are met: $0.38 < 1/f1 < 0.40$; $1.05 < f1/f23 < 1.22$. Therefore, by properly matching the focal lengths of the lenses in the optical lens 100, the optical lens 100 can obtain a wide field angle (FOV) while significantly improving its resolution.

In this embodiment, the FOV of the optical lens 100 is a maximum field of view that the optical lens 100 can capture light. In detail, take the optical lens 100 as a vertex, the field angle is an angle formed by two edges of a maximum range of the optical lens 100 that an object image of a tested object can pass through. The larger the field angle, the larger the field angle, and the smaller an optical magnification (degree to which the optical lens converges or diverges light). A field angle of a lens is negatively correlated with its focal length, the shorter the focal length, the larger the field angle. If the focal length is too short and the field angle is too large, a problem of deepening of a distortion (DIS), difficulty in controlling a chief ray angle (CRA), lens bending, and difficulty in aberration correction can be caused. If the focal length is too long and the field angle is too small, a problem of long lens can be caused, which is not conducive to miniaturizing the optical system and meeting user's needs. In this embodiment, 70°≤FOV≤72°, thus the optical lens 100 can obtain an appropriate and sufficient field angle.

In this embodiment, the relative illumination (RI) of the optical lens 100 satisfies a condition of RI>64%. A brightness of a surface illuminated by a light source is called illuminance, while a ratio of an illuminance at a point on an image plane to an illuminance at a center point of the image plane is called a relative illuminance. If the relative illumination is insufficient, the illumination of the image plane is uneven, which can lead to underexposure in certain positions or overexposure in the center of the image plane, manifested as an image center being brighter and the surroundings being darker, commonly known as vignetting. In addition, low relative illumination may also cause discoloration. There is a negative correlation between RI and FOV. An illuminance uniformity can be improved by reducing the field angle (image side) to increase the relative illuminance. Therefore, the maximum value of the field angle affects the minimum value of the relative illuminance, and the optical lens 100 can obtain the relative illumination with the minimum value in a reasonable range.

In this embodiment, a center thickness (CT) of the first lens 110 along the optical axis O is CT1, an edge thickness (ET) along the optical axis O is ET1, a center thickness of the second lens 120 along the optical axis O is CT2, an edge thickness along the optical axis O is ET2, a center thickness of the third lens 130 along the optical axis O is CT3, and an edge thickness along the optical axis O is ET3, wherein $2.00<CT1/ET1<2.40$, $1.00<CT2/ET2<1.30$, and $1.70<CT3/ET3<1.85$. Therefore, by designing the center thicknesses and the edge thicknesses of the first lens 110, the second lens 120, and the third lens 130, can have appropriate formability and homogeneity, an assembly of the optical lens 100 is simplified, and an assembly yield and a product yield are improved.

In this embodiment, an effective focal length (EFL) and an entrance pupil diameter (EPD) of the optical lens 100 meet the following conditions: $1.484≤EFL≤1.577$, and $1.272≤EPD≤1.428$. An aperture value (F-number, Fno) is defined as a ratio of the effective focal length to the entrance pupil diameter, i.e., Fno=EFL/EPD, and $1.0≤EFL/EPD≤1.3$. The optical lens 100 that can be zoomed has different maximum aperture after conversion, although the maximum entrance pupil diameter is the same when the optical lens 100 has different effective focal lengths. The Fno is negatively correlated with the aperture size, the larger the Fno, the smaller the aperture, while the smaller the Fno, the larger the aperture.

Figure 2:
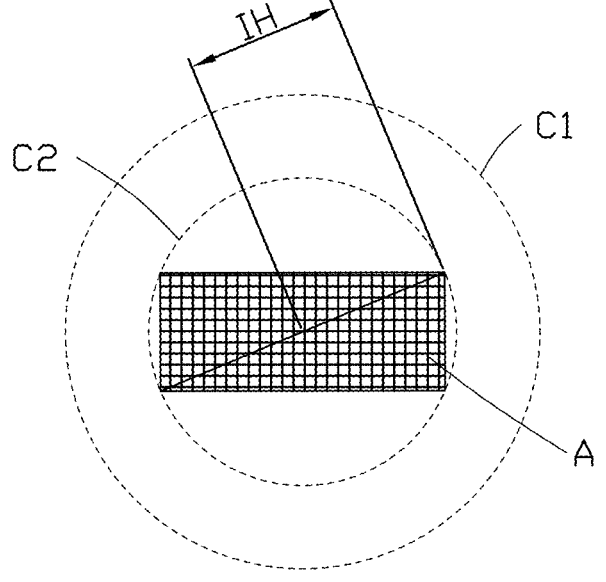
FIG. 2 is a schematic view of a left view of an image plane of the optical lens shown in FIG. 1.

In this embodiment, a maximum image height (IH) and an optical total length (OTL) of the optical lens 100 meet a condition of $2.60<OTL/IH<2.77$. A value of OTL equals a distance from the object surface F1 to the image surface F9, which is related to the thickness and distances of the first lens 110, the second lens 120, and the third lens 130. Referring to FIG. 2, the optical lens 100 forms an imaging circle C1 when images on the image surface F9. The image sensor 150 has an effective pixel area A. The effective pixel area A is a rectangle (not limited) in this embodiment and corresponds to a sensing circle C2. To ensure the best imaging effect, a radius of the imaging circle C1 should be greater than a radius of the sensing circle C2 to prevent black shadows and edge blurring. The value of the maximum image height equals to the radius of the sensing circle C2, which is essentially a circle with the maximum diagonal length of the effective pixel area A as its diameter. Therefore, the value of IH is equal to half of the maximum diagonal length of the effective pixel region A. Moreover, the value of IH can be calculated according to the formula IH=EFL×tan (FOV/2), which means the maximum image height of the optical lens 100 is positively correlated with the effective focal length and the field angle, respectively. By reasonably matching and limiting each lens (the first lens 110, the second lens 120, and the third lens 130) and the aperture 160, a ratio of the optical total length of the optical lens 100 to the maximum image height is more reasonable, which can ensure the performance of the optical lens 100, reducing a space occupied by the optical lens 100, and is conducive to lens miniaturization.

For the convenience of understanding and description, the embodiments of this disclosure have defined the representation forms of the parameters of the optical lens 100, such as using EFL to represent the effective focal length of the optical lens 100, using f1 to represent the focal length of the first lens 110, etc. Letters similar to the definition are used for illustrative purposes but can also be represented in other forms. This disclosure does not impose any limitations.

Units of parameters related to ratios in the above inequalities remain consistent. For example, if a unit of a numerator in an equation is millimeter (mm), a unit of a denominator should be millimeter as well.

The following are three embodiments given in the present disclosure. Every lens in the following embodiments is made of plastic, and every lens in the following embodiments has a refractive index of 1.66 and a dispersion coefficient of 20.4. Every lens in the following embodiments is used to transmit infrared light with a wavelength range of 920 nm~960 nm. The image sensors 150 in the following embodiments are 1/8.5" micro sensors with a length of 1.68 mm and a width of 1.26 mm (with a diagonal length of 2.1 mm). An effective pixel region A of the image sensors 150 includes 240×180 square pixels, and each of the pixels has an edge length of 7 μm.

First Embodiment

Based on the inequality and the formula (1) mentioned above, tables 1 to 3 show design data of the optical lens 100a in the first embodiment.

Table 1 shows basic parameters of the optical lens 100a in the first embodiment of the present disclosure.

TABLE 1

| Fno (Aperture value) = 1.04 | |
| --- | --- |
| Maximum image height IH | 1.050 mm |
| Optical total length OTL | 2.817 mm |
| Distance between the center of the object side surface of the first lens and the image plane TL1 | 2.817 mm |
| Distance between the center of the object side surface of the second lens and the image plane TL2 | 1.919 mm |
| Distance between the center of the object side surface of the third lens and the image plane-TL3 | 1.584 mm |
| Distance between the first lens and the second lens at the optical axis T12 | 0.394 mm |
| Distance between the second lens and the third lens at the optical axis T23 | 0.048 mm |
| OTL/IH | 2.683 |
| Effective focal length EFL | 1.484 mm |
| Entrance pupil diameter EPD | 1.428 mm |
| Field angle FOV | 72° |
| Chief ray angle CRA | <12.1° |

TABLE 1-continued

| Fno (Aperture value) = 1.04 | |
| --- | --- |
| Distortion DIS | −5.6% < DIS < 3.9% |
| Relative illumination RI | >65% |
| Focal length of the first lens f1 | 2.582 mm |
| Focal length of the second lens f2 | −9.506 mm |
| Focal length of the third lens f3 | 2.071 mm |
| Synthetic focal length of the second lens and the third lens f23 | 2.125 mm |
| 1/f1 | 0.387 |
| f1/f23 | 1.215 |
| Center thickness of the first lens CT1 | 0.505 mm |
| Edge thickness of the first lens ET1 | 0.212 mm |
| CT1/ET1 | 2.381 |

TABLE 1-continued

| Fno (Aperture value) = 1.04 | |
| --- | --- |
| Center thickness of the second lens CT2 | 0.287 mm |
| Edge thickness of the second lens ET2 | 0.224 mm |
| CT2/ET2 | 1.280 |
| Center thickness of the third lens CT3 | 0.643 mm |
| Edge thickness of the third lens ET3 | 0.377 mm |
| CT3/ET3 | 1.705 |

Table 2 shows the curvature radius, the thickness (mm), the refractive index, the dispersion coefficient, and the element radius (mm) of each element in the optical lens 100a of the first embodiment.

TABLE 2

| Surface number | Component name | Surface type | Curvature radius | Thickness | Refractive index | Dispersion coefficient | Element radius |
| --- | --- | --- | --- | --- | --- | --- | --- |
| Object surface | Object to be detected | Standard plane | infinite | infinite | — | — | infinite |
| ST0 | aperture 160 | Standard plane | infinite | 0.300 | | | 0.954 |
| | | Standard plane | infinite | 0.016 | | | 0.714 |
| F1 | First lens 110 | Even degree aspherical surface | 2.387 | 0.505 | 1.66 | 20.4 | 0.772 |
| F2 | | Even degree aspherical surface | −4.788 | 0.394 | | | 0.903 |
| F3 | Second lens 120 | Even degree aspherical surface | −0.541 | 0.287 | 1.66 | 20.4 | 0.947 |
| F4 | | Even degree aspherical surface | −0.717 | 0.048 | | | 1.019 |
| F5 | Third lens 130 | Even degree aspherical surface | 0.994 | 0.643 | 1.66 | 20.4 | 1.139 |
| F6 | | Even degree aspherical surface | 3.059 | 0.431 | | | 1.125 |
| F7 | Filter 140 | Standard plane | infinite | 0.210 | — | — | 1.103 |
| F8 | | Standard plane | infinite | 0.300 | | | 1.093 |
| F9 | Image sensor 150 | Standard plane | infinite | 0.000 | | | 1.052 |

The curvature radius of positive value and negative value indicate different protrusion direction of optical surfaces of the lenses of the optical lens 100a, wherein the curvature radius of positive value indicate that part each object surface near the optical axis O is convex, and the curvature radius of negative values indicate that part of each image surface near the optical axis O is convex.

Table 3 shows aspheric coefficients of the optical lens 100a in the first embodiment.

TABLE 3

| | Aspheric coefficient | | | | |
| --- | --- | --- | --- | --- | --- |
| Surface number | K | $A_4$ | $A_6$ | $A_8$ | $A_{10}$ |
| F1 | −85.2969 | 5.0337E−01 | −2.6663E+00 | 6.1069E+00 | −4.1981E+00 |
| F2 | 14.4637 | −3.6597E−01 | 1.4961E+00 | −6.7935E+00 | 1.4898E+01 |

TABLE 3-continued

| | | Aspheric coefficient | | |
|---|---|---|---|---|
| F3 | −2.7031 | −1.1455E+00 | 2.8627E+00 | −4.9157E+00 | 4.7172E+00 |
| F4 | −1.3860 | −5.1769E−01 | 1.3498E+00 | 1.6154E−01 | −7.1877E+00 |
| F5 | −23.6037 | 8.1949E−01 | −2.5162E+00 | 5.8464E+00 | −9.0177E+00 |
| F6 | 4.2165 | −2.7940E−01 | 6.4946E−01 | −4.1528E−01 | −1.1345E+00 |

| Surface number | $A_{12}$ | $A_{14}$ | $A_{16}$ | $A_{18}$ | $A_{20}$ |
|---|---|---|---|---|---|
| F1 | −1.9358E+00 | −2.2102E+01 | 2.9920E+01 | 6.0500E+01 | −8.4554E+01 |
| F2 | −1.5507E+01 | −7.7087E−01 | 1.6663E+01 | −9.0664E+00 | −1.2988E+00 |
| F3 | 1.8772E+00 | −6.0458E+00 | 1.5518E−01 | 5.2391E+00 | −2.8071E+00 |
| F4 | 1.0905E+01 | 6.5386E+00 | −3.0477E+01 | 2.7364E+01 | −8.1179E+00 |
| F5 | 8.0214E+00 | −2.4832E+00 | −1.9520E+00 | 1.9193E+00 | −4.6813E−01 |
| F6 | 2.8352E+00 | −2.6597E+00 | 9.3147E−01 | 8.0886E−02 | −8.4651E−02 |

FIGS. 3A to 3G describe optical performances of the optical lens 100a in the first embodiment by using an optical simulation software.

Figure 3A:
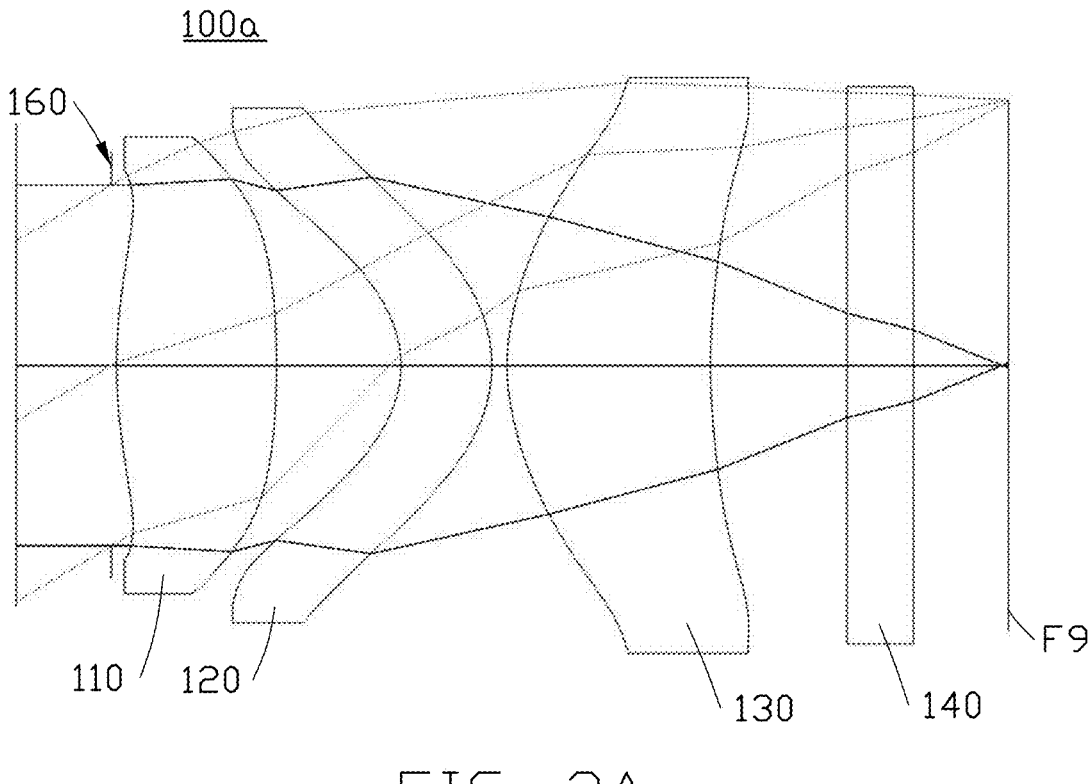
FIG. 3A is an illustration of an optical path of a first embodiment of an optical lens according to the present disclosure.

FIG. 3A shows an optical path of light with a wavelength of 940 nm passing through the optical lens 100a in the first embodiment.

Figure 3B:
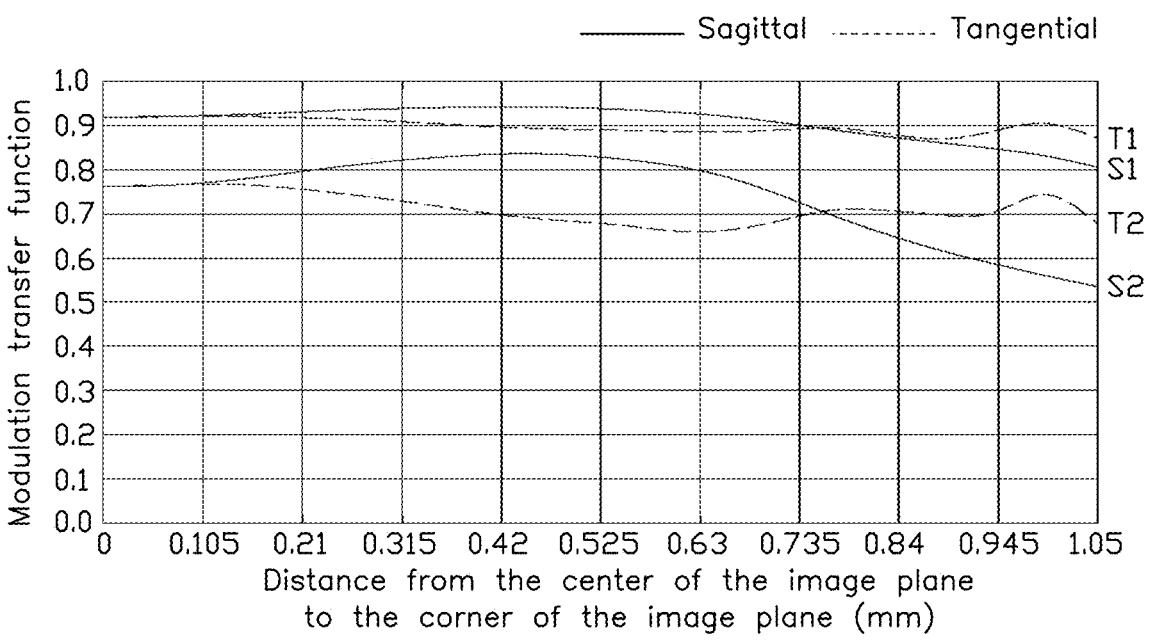
FIG. 3B is an illustration of a modulation transfer function of the optical lens shown in FIG. 3A.

FIG. 3B shows a modulation transfer function (MTF) of light with a wavelength from 920 nm to 960 nm after passing through the optical lens 100a in the first embodiment. A distribution of light in any optical image can be seen as a linear combination of countless spatial frequency sine wave distribution, wherein a modulation degree of the sine wave distribution is a ratio of an amplitude to an average value of the sine wave distribution. A function of a modulation varies with a spatial frequency is called the modulation transfer function (MTF). The modulation transfer function takes a spatial frequency as an independent variable and can reflect an ability of an optical system to transmit sinusoidal modulation of various frequencies. An MTF curve chart is an important indicator used to evaluate lens performance. The MTF curve chart can evaluate a detailed restoration ability of a measured object and can comprehensively and objectively characterize sharpness of imaging. The MTF curve provides information including resolution and contrast from the center of the lens to the edge of the lens, as well as the degree of image field curvature. A horizontal axis in FIG. 3B represents a distance (mm) from the center of the image plane to the corner of the image plane, "0" in FIG. 3B represents a center of the image plane, and a vertical axis in FIG. 3B represents a modulation transfer function, wherein the modulation transfer function can reflect values of a contrast and a resolution. A value of the modulation transfer function is between 0 to 1. The closer the value of the modulation transfer function is to 1, the closer the contrast and the resolution are to 100%, which indicates a better imaging effect of the lens. Generally, the value of the modulation transfer function greater than 0.9 is considered extremely excellent, and the value of the modulation transfer function between 0.7 to 0.9 is considered excellent. A calculation unit of spatial frequency in the MTF curve can be expressed as line pairs per millimeter (lps/mm). In this embodiment, ¼ and ½ Nyquist frequencies (Nyquist, Ny) were used for MTF testing, and a value of Ny depends on a size of the pixel.

As shown in FIG. 3B, a solid line group including a sagittal line S1 and a sagittal line S2, wherein the sagittal line S1 represent a MTF curve of an images obtained by a sagittal beam under ¼Ny condition, and the sagittal line S2 represent a MTF curve of an image obtained by a sagittal beam under ½Ny condition. A dashed line group including tangential line T1 and tangential line T2, wherein the tangential line T1 represent a MTF curve of an image obtained by a tangential beam under ¼Ny condition, and the tangential line T2 represent a MTF curve of an image obtained by a tangential beam under ½Ny condition. FIG. 3B includes curves T1 and S1 with darker grayscale (close to black) and curves T2 and S2 with lighter grayscale (close to gray). Curves T1 and S1 represent a set of spatial frequencies with a same value, while Curves T2 and S2 represent another set of spatial frequencies with a same value different from that of the curves T1 and S1. The curves T1 and S1 correspond to ¼Ny and 18 lps/mm, which indicates that the lens can generate low spatial frequencies. The curves T1 and S1 reflect a contrast of the lens, a brightness intensity of an image formed by the lens, and a color contrast of the image. The curves T2 and S2 correspond to ½Ny and 36 lps/mm, which indicates that the lens can generate high spatial frequencies. The curves T2 and S2 reflect a resolution of the lens and an ability of the lens to reproduce object details. The higher the positions of the curves T1 and S1, the higher the contrast of the lens, and the higher the positions of the curves T2 and S2, the higher the resolution of the lens at full aperture. The steeper a waveform of the curves, the more severe an aberration change of the lens, which indicate that there is a defect in the lens design. The closer the curves T1 and S1 are, and the closer the curves T2 and S2 are, the softer and more natural an out of focus imaging of the lens, and the better the imaging effect. As the distance from the center of the lens to the edge increases, the resolution and the contrast of the optical lens 100a change within a relatively high range, and a trend of change is relatively flat, wherein the curves T1 and S1 are closed to each other, the curves T2 and S2 are closed to each other, and the imaging effect is better.

Figure 3C:
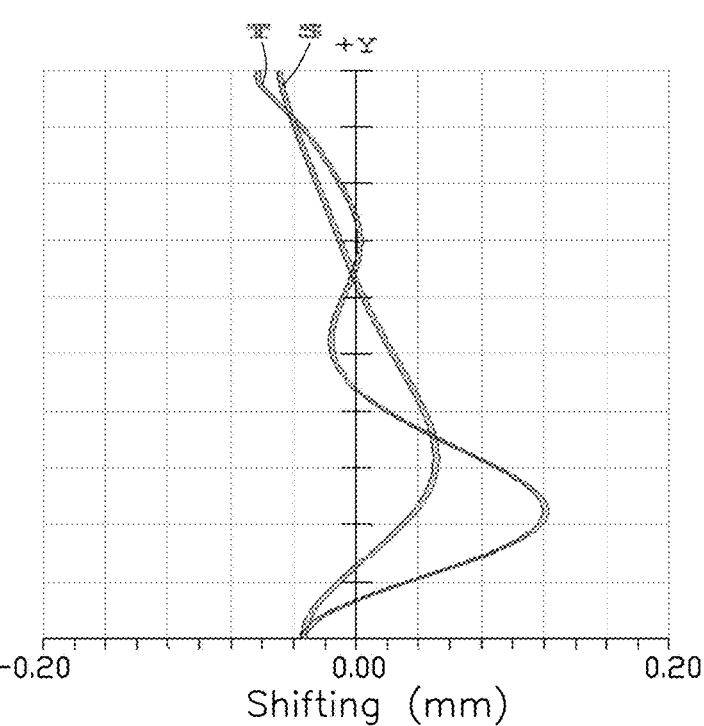
FIG. 3C is an illustration of a field curvature of the optical lens shown in FIG. 3A.

FIG. 3C shows a field curvature of light with wavelengths of 920 nm, 940 nm, and 960 nm incident at a ratio of 1:2:1 in light radiation intensity, passing through the optical lens 100a. The field curvature is an aberration caused by defects in a lens itself. Light from an object plane perpendicular to the optical axis O passes through the lens and is focused for imaging. An image plane with a best clarity obtained is not a flat plane, but a curved plane. A curve labeled S in the FIG. 3C represents a field curve of a sagittal surface, and a curve labeled T in the FIG. 3C represents a field curve of a tangential surface. The sagittal surface refers to a surface perpendicular to the tangential surface and passing through a main light from an object point outside the main optical axis O of the optical system (optical lens 100). The tangential surface refers to a surface formed by the main light and the main optical axis O of the optical system (optical lens 100). As shown in FIG. 3C, a horizontal axis represents an amount of offset (mm), and the field curve S is within 0.05 mm of the horizontal axis, while the field curve T is within 0.12 mm of the horizontal axis, which means the optical lens 100a has a good correction effect on field curvature.

Figure 3D:
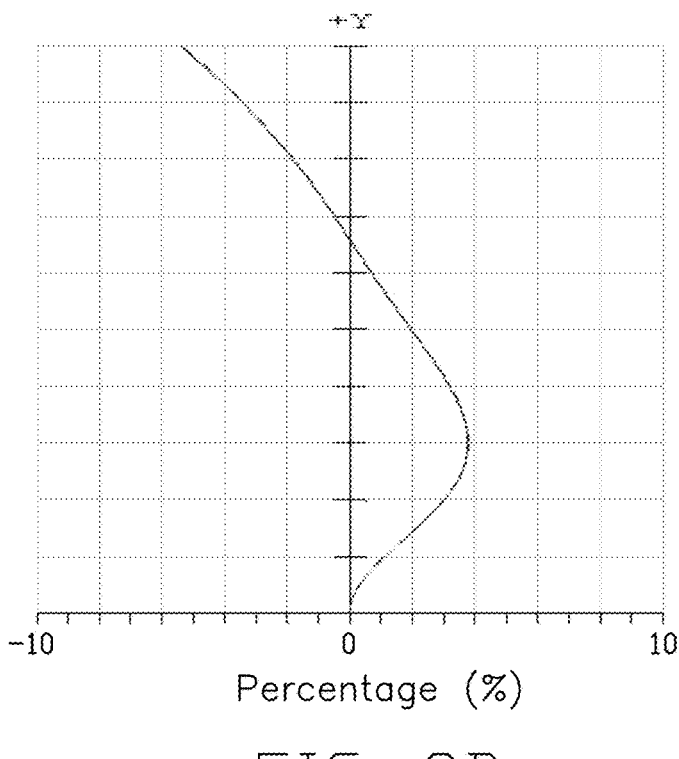
FIG. 3D is an illustration of a distortion of the optical lens shown in FIG. 3A.

FIG. 3D shows distortions of light with wavelengths of 920 nm, 940 nm, and 960 nm incident at a ratio of light radiation intensity of 1:2:1 after passing through the optical lens 100a in the first embodiment. In this embodiment, distortion refers to a deformation degree of an image formed by the optical system (optical lens 100) relative to an object itself, which is also an aberration caused by defects in the lens itself. Due to an influence of an aperture spherical aberration, a height of an intersection point between chief rays of different fields of view passing through an optical system and the Gaussian image plane (determined by Gaussian optics as the ideal image plane) is not equal to the an ideal image height, wherein a difference between the height and the ideal image height is called the distortion. The distortion changes an imaging position of off-axis objects on the ideal plane, affect a magnification of different fields of view on the image plane (that is, affect a redistribution of objects after imaging), cause distortion in a shape of the image, but not affect a clarity of the image. Unequal local magnification can cause distortion of the image plane. The distortion includes orthodontic distortion and negative distortion. If the magnification on an edge of the object is greater than that of the center of the object, it is considered the orthodontic distortion, while if the magnification on the edge of the object is less than that of the center of the object, it is considered the negative distortion. As shown in FIG. 3D, a horizontal axis represents distortion (%), so the optical lens 100a meets the condition of −5.6%<DIS<3.9%, which has a good correction effect on the distortion.

Figure 3E:
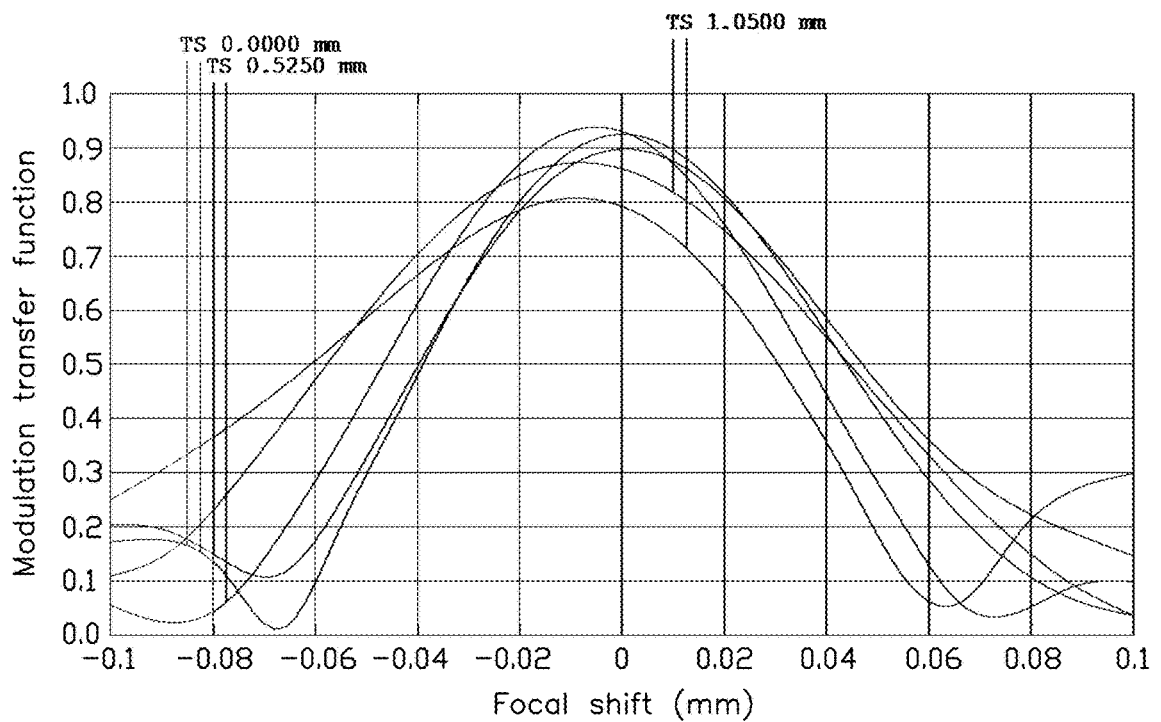
FIG. 3E is an illustration of a focal shift of the optical lens shown in FIG. 3A.

FIG. 3E shows a defocusing of light with wavelengths ranging from 920 nm to 960 nm after passing through the optical lens 100a in the first embodiment. A defocus curve represents changes of MTF value when the image plane deviates from a design value. The more the image plane deviates from the design value, the more the MTF value decreases. Moreover, the higher a peak position of the defocus curve, the better an imaging effect. The optical system can clearly image at the image plane when focusing. When the defocus increases, the image obtained becomes blurry. As shown in FIG. 3E, a horizontal axis represents a deviation distance between the front and back of the image plane, and a vertical axis represents the modulation transfer function, wherein the spatial frequency of the defocus curve TS is 18 lps/mm. When the deviation distance between the front and back of the image plane is 0 mm and 0.525 mm, the corresponding peak value of the defocusing curve TS are at a relatively high position, and the peak value of the MTF remain within a range of 0.85 to 0.95. When the deviation distance between the front and back of the image plane is 1.05 mm, the MTF value decreases the most, but the peak value is still greater than 0.8. Therefore, the optical lens 100a can achieve good imaging results.

Figure 3F:
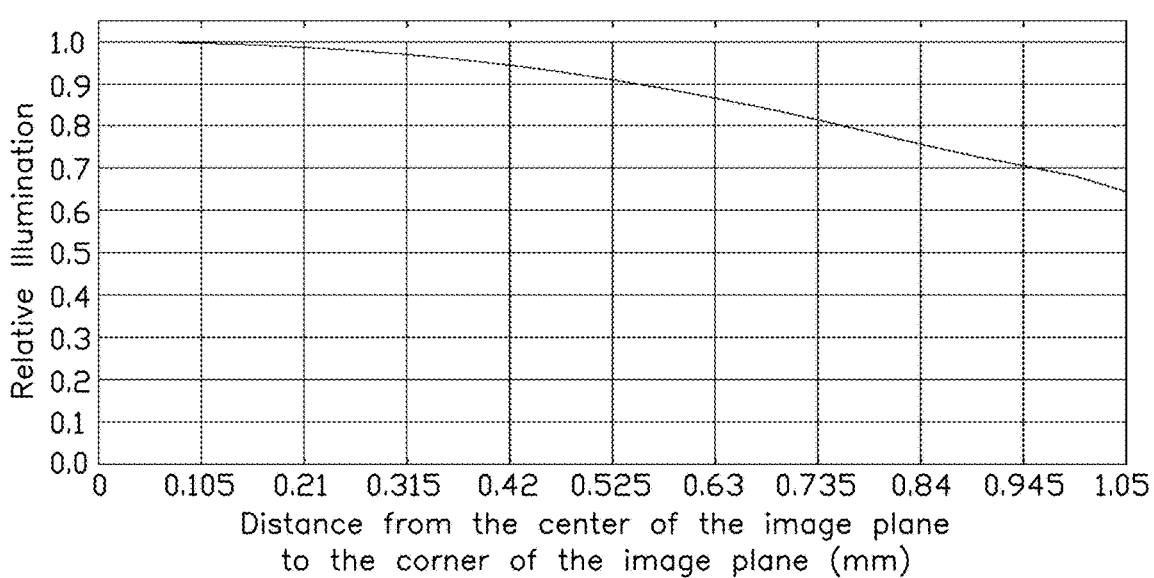
FIG. 3F is an illustration of a relative illumination of the optical lens shown in FIG. 3A.

FIG. 3F shows the relative illumination of light with a wavelength of 940 nm after passing through the optical lens 100a in the first embodiment. A horizontal axis represents a distance (mm) from the center of the image plane to the corner of the image plane, and a vertical axis represents the relative illumination. Therefore, the optical lens 100a meets the condition of RI>65% and has a higher relative illumination, which is conducive to clearer imaging.

Figure 3G:
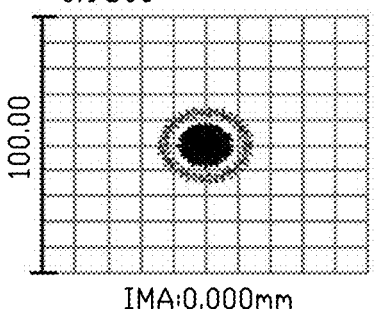
FIG. 3G is an illustration of a spot diagram of the optical lens shown in FIG. 3A.
Figure 3G:
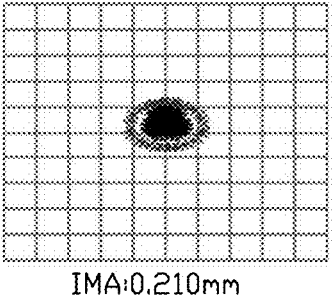
Figure 3G:
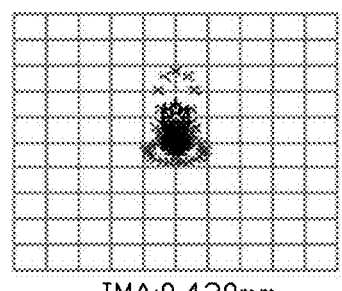
Figure 3G:
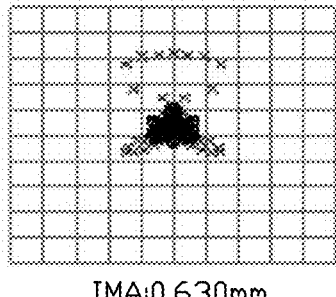
Figure 3G:
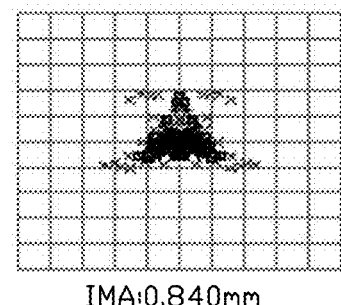
Figure 3G:
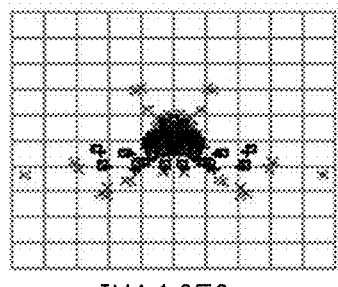

FIG. 3G is a spot diagram of light with wavelengths of 920 nm, 940 nm, and 960 nm incident at a ratio of 1:2:1 in light radiation intensity, passing through the optical lens 100a in the first embodiment. After multiple light beams from a single point passing through an optical system, the light beams no longer concentrate at a same point on an image plane because an influence of an aberration, which forms a diffuse pattern scattered within a certain range, called the spot diagram. In an optical simulation software, several light-emitting points at different positions at an infinite distance are defined. Light from the light-emitting points pass through the optical lens 100a and forms an image, which results in the spot diagram displayed on a simulated image plane IMA. Distribution of intersections of the image plane and light from different fields of views can be presented with different spot diagrams. A distribution of scattered spots in a spot diagram can be approximated as an energy distribution of image points. A density of the scattered spots can measure a quality of the system's imaging. The density can be measured by calculating a root mean square radius (u m) and a geometric (maximum) radius (u m) of each spot diagram.

As shown in FIG. 3G, the spot diagram refers to chief rays and shows different image heights of intersection points of six chief rays and the image plane IMA. That is, the spot diagrams represent different distances from the intersection point of the chief ray and the image plane IMA to the optical axis O. Values of image heights are 0.000 mm, 0.210 mm, 0.420 mm, 0.630 mm, 0.840 mm, and 1.050 mm, respectively. As the values increase, density of the scattered spots reduces from the center to the edge. Moreover, the corresponding root mean square radius are 6.288 μm, 6.121 μm, 5.959 μm, 8.073 μm, 8.652 μm, and 11.446 μm, and the corresponding geometric (maximum) radius are 13.036 μm, 12.134 μm, 27.929 μm, 32.578 μm, 24.982 μm, and 47.971 μm. In the spot diagrams, the smaller the root mean square radius value (μm) and the geometric (maximum) radius (μm), the greater the density of the image points, and the closer of the image points to the central image point corresponding to the main light, which indicates better imaging quality.

Second Embodiment

Based on the inequality and the formula (1) mentioned above, tables 4 to 6 show design data of the optical lens 100b in the second embodiment.

Table 4 shows basic parameters of the optical lens 100b in the second embodiment of the present disclosure.

TABLE 4

| Fno (Aperture value) = 1.14 | |
| --- | --- |
| Maximum image height IH | 1.050 mm |
| Optical total length OTL | 2.877 mm |
| Distance between the center of the object side surface of the first lens and the image plane TL1 | 2.877 mm |
| Distance between the center of the object side surface of the second lens and the image plane TL2 | 1.961 mm |
| Distance between the center of the object side surface of the third lens and the image plane TL3 | 1.593 mm |
| Distance between the first lens and the second lens at the optical axis T12 | 0.372 mm |
| Distance between the second lens and the third lens at the optical axis T23 | 0.045 mm |
| OTL/IH | 2.740 |
| Effective focal length EFL | 1.546 mm |
| Entrance pupil diameter EPD | 1.356 mm |

TABLE 4-continued

| Fno (Aperture value) = 1.14 | |
| --- | --- |
| Field angle FOV | 71° |
| Chief ray angle CRA | <13.2° |
| Distortion DIS | −5.38% < DIS < 3.8% |
| Relative Illumination RI | >64% |
| Focal length of the first lens f1 | 2.517 mm |
| Focal length of the second lens f2 | −9.119 mm |
| Focal length of the third lens f3 | 2.237 mm |
| Synthetic focal length of the second lens and the third lens f23 | 2.283 mm |
| 1/f1 | 0.397 |
| f1/f23 | 1.102 |
| Center thickness of the first lens CT1 | 0.544 mm |
| Edge thickness of the first lens ET1 | 0.262 mm |

TABLE 4-continued

| Fno (Aperture value) = 1.14 | |
| --- | --- |
| CT1/ET1 | 2.076 |
| Center thickness of the second lens CT2 | 0.323 mm |
| Edge thickness of the second lens ET2 | 0.287 mm |
| CT2/ET2 | 1.125 |
| Center thickness of the third lens CT3 | 0.572 mm |
| Edge thickness of the third lens ET3 | 0.317 mm |
| CT3/ET3 | 1.804 |

Table 5 shows the curvature radius, the thickness (mm), the refractive index, the dispersion coefficient, and the element radius (mm) of each component of the optical lens 100b in the second embodiment of the present disclosure.

TABLE 5

| Surface number | Component name | Surface type | Curvature radius | Thickness | Refractive index | Dispersion coefficient | Element radius |
| --- | --- | --- | --- | --- | --- | --- | --- |
| Object surface | Object to be detected | Standard plane | infinite | infinite | — | — | infinite |
| ST0 | aperture 160 | Standard plane | infinite | 0.300 | | | 0.912 |
| | | Standard plane | infinite | 0.016 | | | 0.678 |
| F1 | First lens 110 | Even degree aspherical surface | 2.580 | 0.544 | 1.66 | 20.4 | 0.737 |
| F2 | | Even degree aspherical surface | −3.843 | 0.372 | | | 0.870 |
| F3 | Second lens 120 | Even degree aspherical surface | −0.529 | 0.323 | 1.66 | 20.4 | 0.913 |
| F4 | | Even degree aspherical surface | −0.720 | 0.045 | | | 0.999 |
| F5 | Third lens 130 | Even degree aspherical surface | 1.039 | 0.572 | 1.66 | 20.4 | 1.115 |
| F6 | | Even degree aspherical surface | 3.068 | 0.511 | | | 1.120 |
| F7 | Filter 140 | Standard plane | infinite | 0.210 | — | — | 1.098 |
| F8 | | Standard plane | infinite | 0.300 | | | 1.090 |
| F9 | Image sensor 150 | Standard plane | infinite | 0.000 | | | 1.054 |

Table 5 shows the curvature radius, the thickness, the refractive index, the dispersion coefficient, the radius of each component of optical lens 100b in the second embodiment.

Table 6 shows an aspheric coefficients of the optical lens 100b in the second embodiment of the present disclosure.

TABLE 6

| Aspheric coefficient | | | | | |
| --- | --- | --- | --- | --- | --- |
| Surface number | K | A | $A_6$ | $A_8$ | $A_{10}$ |
| F1 | −85.7718 | 4.8808E−01 | −2.6088E+00 | 5.9909E+00 | −4.5150E+00 |
| F2 | 15.5894 | −3.7427E−01 | 1.5435E+00 | −6.8305E+00 | 1.4912E+01 |
| F3 | −2.8057 | −1.1267E+00 | 2.8912E+00 | −4.9034E+00 | 4.7102E+00 |
| F4 | −1.6463 | −4.9728E−01 | 1.3380E+00 | 1.4668E−01 | −7.1846E+00 |

TABLE 6-continued

| | | Aspheric coefficient | | |
|---|---|---|---|---|
| F5 | −25.2194 | 8.0821E−01 | −2.5149E+00 | 5.8469E+00 | −9.0198E+00 |
| F6 | 4.4732 | −2.8661E−01 | 6.1710E−01 | −4.0451E−01 | −1.1225E+00 |

| Surface number | $A_{12}$ | $A_{14}$ | $A_{16}$ | $A_{18}$ | $A_{20}$ |
|---|---|---|---|---|---|
| F1 | −1.8933E+00 | −2.1066E+01 | 3.1667E+01 | 6.0675E+01 | −9.0271E+01 |
| F2 | −1.5415E+01 | −6.7384E−01 | 1.6690E+01 | −9.0914E+00 | −1.3861E+00 |
| F3 | 1.8627E+00 | −6.0532E+00 | 1.5018E−01 | 5.2370E+00 | −2.8043E+00 |
| F4 | 1.0914E+01 | 6.5408E+00 | −3.0466E+01 | 2.7360E+01 | −8.1283E+00 |
| F5 | 8.0181E+00 | −2.4845E+00 | −1.9515E+00 | 1.9201E+00 | −4.6770E−01 |
| F6 | 2.8373E+00 | −2.6608E+00 | 9.2717E−01 | 7.8547E−02 | −8.2536E−02 |

FIGS. 4A to 4G describe optical performances of the optical lens 100$b$ in the second embodiment by using an optical simulation software.

Figure 4A:
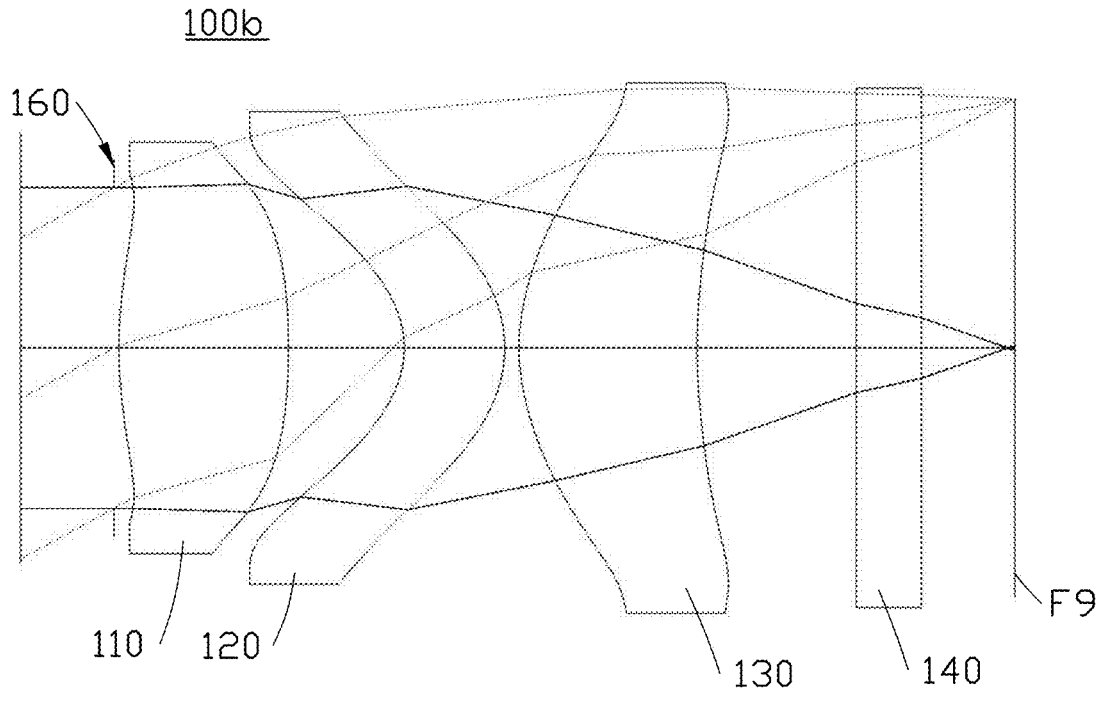
FIG. 4A is an illustration of an optical path of a second embodiment of an optical lens according to the present disclosure.

FIG. 4A shows an optical path of light with a wavelength of 940 nm passing through the optical lens 100$b$ in the second embodiment.

Figure 4B:
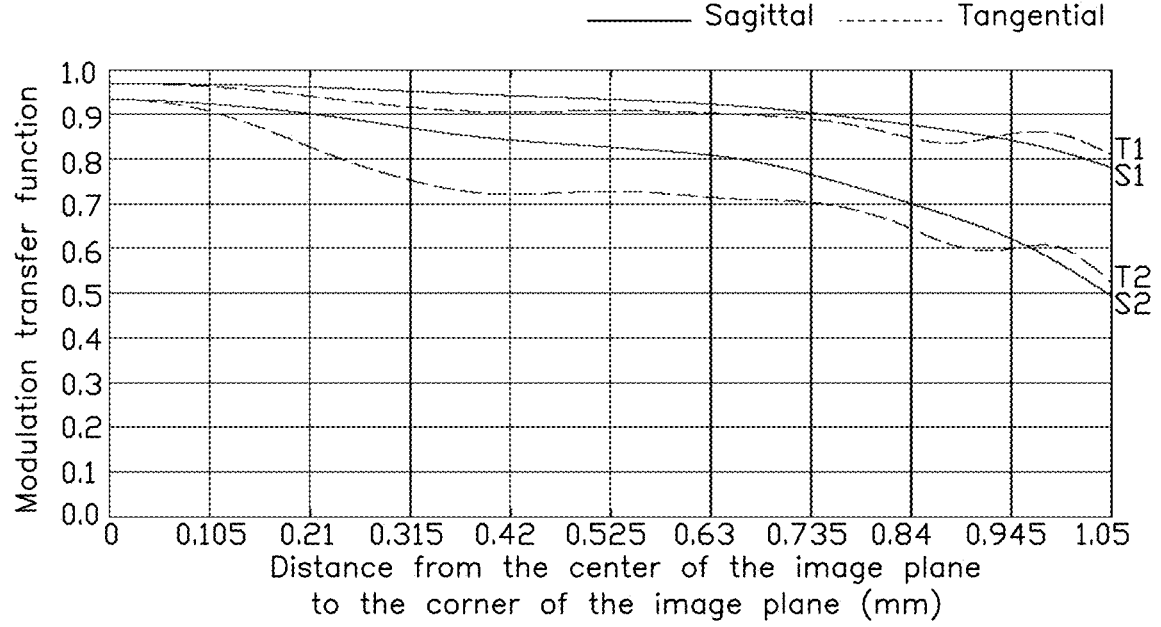
FIG. 4B is an illustration of a modulation transfer function of the optical lens shown in FIG. 4A.

FIG. 4B shows the modulation transfer function (MTF) of light with a wavelength from 920 nm to 960 nm after passing through the optical lens 100$b$ in the second embodiment. As the distance from the center of the image plane to the corner of the image plane increases, a resolution and a contrast of the optical lens 100$b$ changes slowly within a high value range, wherein curves T1 and S1 are close and curve T2 and S2 are close, which results in a good imaging effect.

Figure 4C:
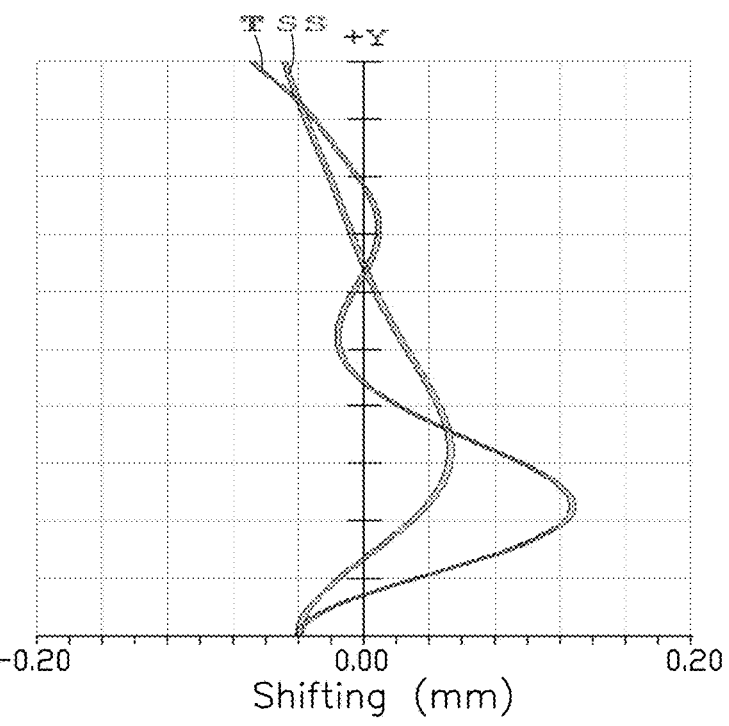
FIG. 4C is an illustration of a field curvature of the optical lens shown in FIG. 4A.

FIG. 4C shows the field curvature of light with wavelengths of 920 nm, 940 nm, and 960 nm incident at a ratio of 1:2:1 in light radiation intensity, passing through the optical lens 100$b$ in the second embodiment. The field curve S is within 0.05 mm of a horizontal axis, and the field curve T is within 0.14 mm of a horizontal axis, which means the field curvature of a sagittal plane of the optical lens 100$b$ is within 0.05 mm, and the field curvature of a tangent plane is within 0.14 mm, which has a good correction effect on the field curvature.

Figure 4D:
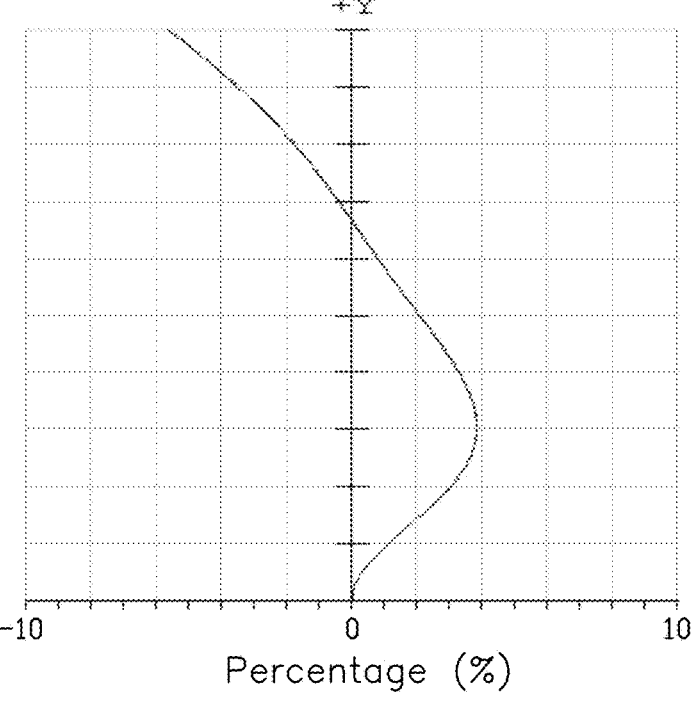
FIG. 4D is an illustration of a distortion of the optical lens shown in FIG. 4A.

FIG. 4D shows distortions of light with wavelengths of 920 nm, 940 nm, and 960 nm incident at a ratio of light radiation intensity of 1:2:1 after passing through the optical lens 100$b$ in the second embodiment. The optical lens 100$b$ meets a condition of −5.38%<DIS<3.8%, and has a good correction effect on distortion.

Figure 4E:
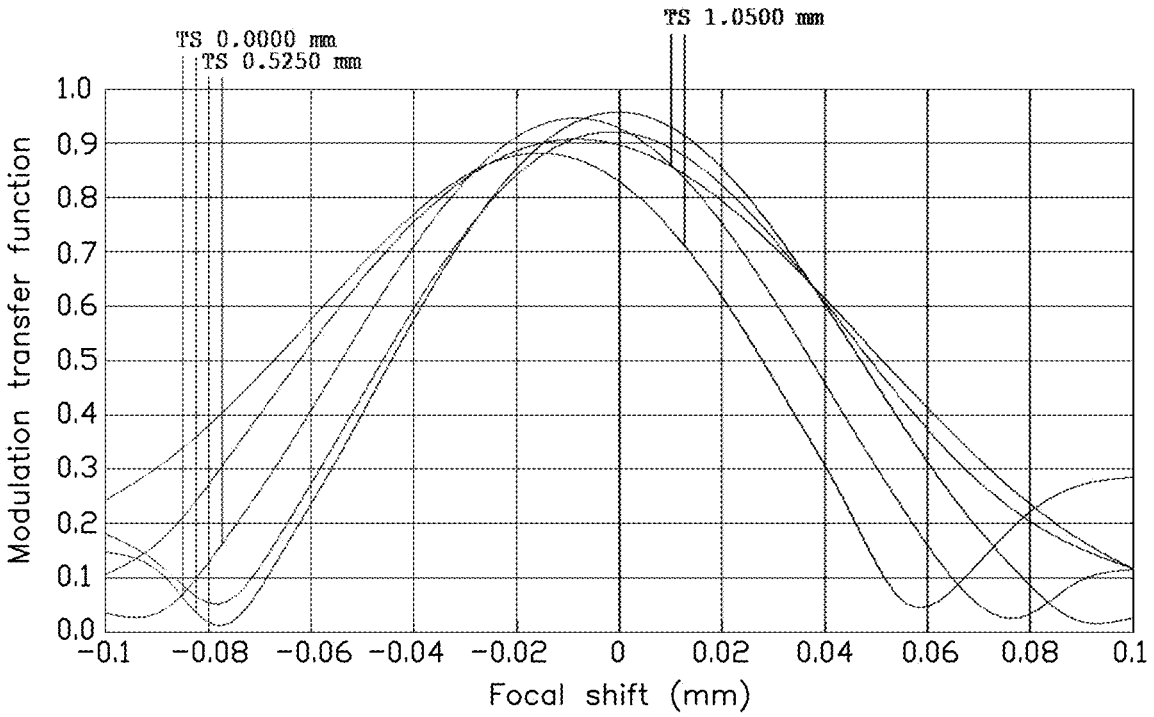
FIG. 4E is an illustration of a focal shift of the optical lens shown in FIG. 4A.

FIG. 4E shows the defocusing of light with wavelengths ranging from 920 nm to 960 nm after passing through the optical lens 100$b$ in the second embodiment. When a distance between the front and back deviation of the image plane is 0 mm, 0.525 mm, and 1.05 mm respectively, peak values of corresponding defocusing curves TS are all at a high position, and the MTF peak values remain within the range of 0.85 to 0.95, wherein the optical lens 100$b$ can achieve good imaging results.

Figure 4F:
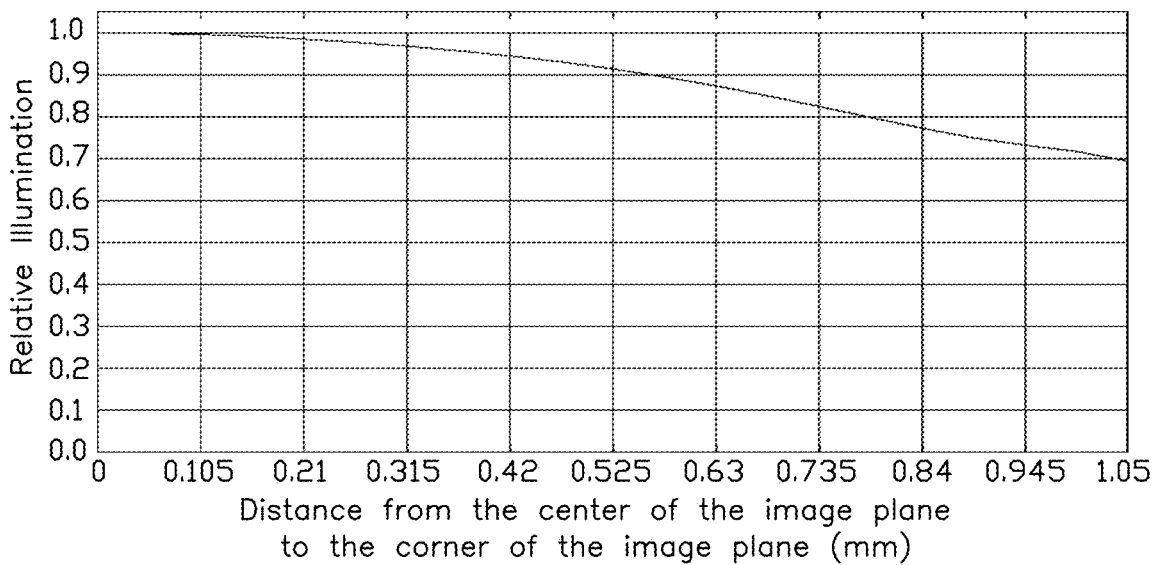
FIG. 4F is an illustration of a relative illumination of the optical lens shown in FIG. 4A.

FIG. 4F shows the relative illumination of light with a wavelength of 940 nm after passing through the optical lens 100$b$ in the second embodiment. The optical lens 100$b$ meets a condition of RI>64% and has high relative illumination, which is conducive to clearer imaging.

Figure 4G:
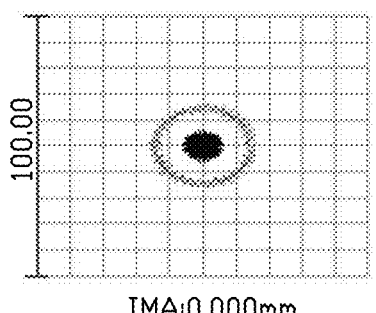
FIG. 4G is an illustration of a spot diagram of the optical lens shown in FIG. 4A.
Figure 4G:
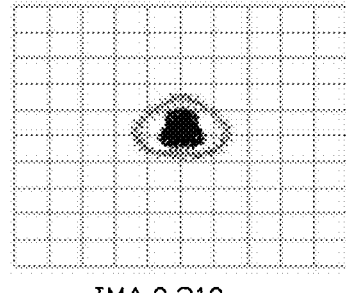
Figure 4G:
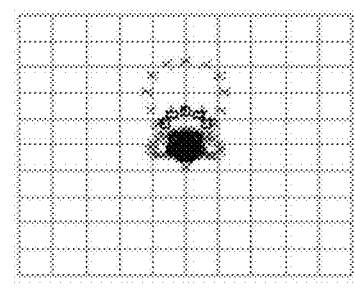
Figure 4G:
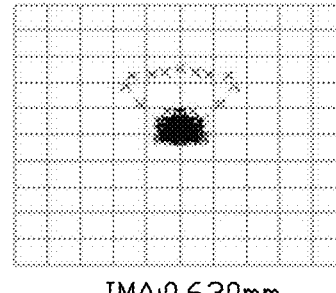
Figure 4G:
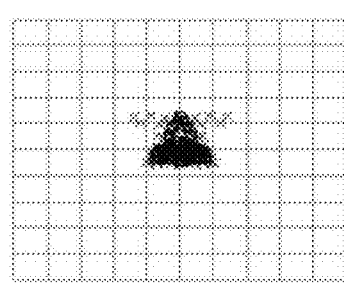
Figure 4G:
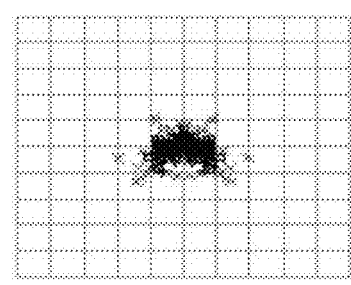

FIG. 4G is a spot diagram of light with wavelengths of 920 nm, 940 nm, and 960 nm incident at a ratio of 1:2:1 in light radiation intensity, passing through the optical lens 100$b$ in the second embodiment. Values of image heights corresponding to different intersection of main light and the image surface IMA are 0.000 mm, 0.210 mm, 0.420 mm, 0.630 mm, 0.840 mm, and 1.050 mm, respectively. As the values increase, density of image spots in the spot diagram reduces from a center to an edge of the spot diagram. Moreover, the corresponding root mean square radius are 5.867 μm, 6.025 μm, 6.991 μm, 6.496 μm, 6.153 μm, and 7.324 μm, and the corresponding geometric (maximum) radius are 14.467 μm, 14.669 μm, 32.260 μm, 26.836 μm, 18.799 μm, 19.991 μm. In the spot diagrams, the smaller the root mean square radius value (μm) and the geometric (maximum) radius (μm), the greater the density of the image spots, and the closer of the image spots to a central image spot corresponding to the main light, which indicates better imaging quality.

Third Embodiment

Based on the inequality and the formula (1) mentioned above, tables 7 to 9 show design data of the optical lens 100$c$ in the third embodiment.

Table 7 shows basic parameters of the optical lens 100$c$ in the third embodiment of the present disclosure.

TABLE 7

| Fno (Aperture value) = 1.24 | |
|---|---|
| Maximum image height IH | 1.050 mm |
| Optical total length OTL | 2.908 mm |
| Distance between the center of the object side surface of the first lens and the image plane TL1 | 2.908 mm |
| Distance between the center of the object side surface of the second lens and the image plane TL2 | 2.008 mm |
| Distance between the center of the object side surface of the third lens and the image plane TL3 | 1.637 mm |
| Distance between the first lens and the second lens at the optical axis T12 | 0.363 mm |
| Distance between the second lens and the third lens at the optical axis T23 | 0.048 mm |
| OTL/IH | 2.770 |
| Effective focal length EFL | 1.577 mm |
| Entrance pupil diameter EPD | 1.273 mm |
| Field angle FOV | 70° |
| Chief ray angle CRA | <14° |
| Distortion DIS | −5.27% < DIS < 3.6% |
| Relative Illumination RI | >67% |
| Focal length of the first lens f1 | 2.522 mm |
| Focal length of the second lens f2 | −6.291 mm |
| Focal length of the third lens f3 | 2.130 mm |
| Synthetic focal length of the second lens and the third lens f23 | 2.393 mm |
| 1/f1 | 0.397 |
| f1/f23 | 1.054 |
| Center thickness of the first lens CT1 | 0.537 mm |
| Edge thickness of the first lens ET1 | 0.262 mm |
| CT1/ET1 | 2.048 |

TABLE 7-continued

| Fno (Aperture value) = 1.24 | |
| --- | --- |
| Center thickness of the second lens CT2 | 0.324 mm |
| Edge thickness of the second lens ET2 | 0.323 mm |
| CT2/ET2 | 1.003 |
| Center thickness of the third lens CT3 | 0.570 mm |

TABLE 7-continued

| Fno (Aperture value) = 1.24 | |
| --- | --- |
| Edge thickness of the third lens ET3 | 0.327 mm |
| CT3/ET3 | 1.742 |

Table 8 shows the curvature radius, the thickness (mm), the refractive index, the dispersion coefficient, and the element radius (mm) of each component of the optical lens 100c in this embodiment of the present disclosure.

TABLE 8

| Surface number | Component name | Surface type | Curvature radius | Thickness | Refractive index | Dispersion coefficient | Element radius |
| --- | --- | --- | --- | --- | --- | --- | --- |
| Object surface | Object to be detected | Standard plane | infinite | infinite | — | — | infinite |
| ST0 | aperture 160 | Standard plane | infinite | 0.300 | | | 0.866 |
| | | Standard plane | infinite | 0.016 | | | 0.637 |
| F1 | First lens 110 | Even degree aspherical surface | 2.641 | 0.537 | 1.66 | 20.4 | 0.694 |
| F2 | | Even degree aspherical surface | −3.736 | 0.363 | | | 0.820 |
| F3 | Second lens 120 | Even degree aspherical surface | −0.511 | 0.324 | 1.66 | 20.4 | 0.848 |
| F4 | | Even degree aspherical surface | −0.731 | 0.048 | | | 0.953 |
| F5 | Third lens 130 | Even degree aspherical surface | 0.988 | 0.570 | 1.66 | 20.4 | 1.097 |
| F6 | | Even degree aspherical surface | 2.863 | 0.557 | | | 1.098 |
| F7 | Filter 140 | Standard plane | infinite | 0.210 | — | — | 1.084 |
| F8 | | Standard plane | infinite | 0.300 | | | 1.080 |
| F9 | Image sensor 150 | Standard plane | infinite | 0.000 | | | 1.051 |

Table 8 shows the curvature radius, the thickness, the refractive index, the dispersion coefficient, and the radius of each component of the optical lens 100c.

Table 9 shows the aspheric coefficients of the optical lens 100c in this embodiment of the present disclosure.

TABLE 9

| | Aspheric coefficient | | | | |
| --- | --- | --- | --- | --- | --- |
| Surface number | K | A | $A_6$ | $A_8$ | $A_{10}$ |
| F1 | −102.2017 | 5.0518E−01 | −2.6513E+00 | 5.8563E+00 | −4.6015E+00 |
| F2 | 15.2327 | −4.0257E−01 | 1.5143E+00 | −6.8312E+00 | 1.4918E+01 |
| F3 | −2.7280 | −1.1401E+00 | 2.8817E+00 | −4.8991E+00 | 4.7280E+00 |
| F4 | −1.6160 | −4.9317E−01 | 1.3461E+00 | 1.4991E−01 | −7.1893E+00 |
| F5 | −21.8379 | 8.2386E−01 | −2.5182E+00 | 5.8454E+00 | −9.0206E+00 |
| F6 | 4.0352 | −2.6000E−01 | 6.1468E−01 | −4.1383E−01 | −1.1281E+00 |

TABLE 9-continued

| Aspheric coefficient | | | | | |
| --- | --- | --- | --- | --- | --- |
| Surface number | $A_{12}$ | $A_{14}$ | $A_{16}$ | $A_{18}$ | $A_{20}$ |
| F1 | −1.7230E+00 | −2.0517E+01 | 3.2324E+01 | 6.0326E+01 | −9.4918E+01 |
| F2 | −1.5423E+01 | −6.9322E−01 | 1.6655E+01 | −9.0950E+00 | −1.2104E+00 |
| F3 | 1.8837E+00 | −6.0326E+00 | 1.6485E−01 | 5.2386E+00 | −2.8443E+00 |
| F4 | 1.0907E+01 | 6.5361E+00 | −3.0468E+01 | 2.7362E+01 | −8.1134E+00 |
| F5 | 8.0175E+00 | −2.4848E+00 | −1.9516E+00 | 1.9204E+00 | −4.6702E−01 |
| F6 | 2.8359E+00 | −2.6601E+00 | 9.2841E−01 | 7.9291E−02 | −8.2362E−02 |

FIG. 5A to 5G describe optical performances of the optical lens 100c in the third embodiment by using an optical simulation software.

Figure 5A:
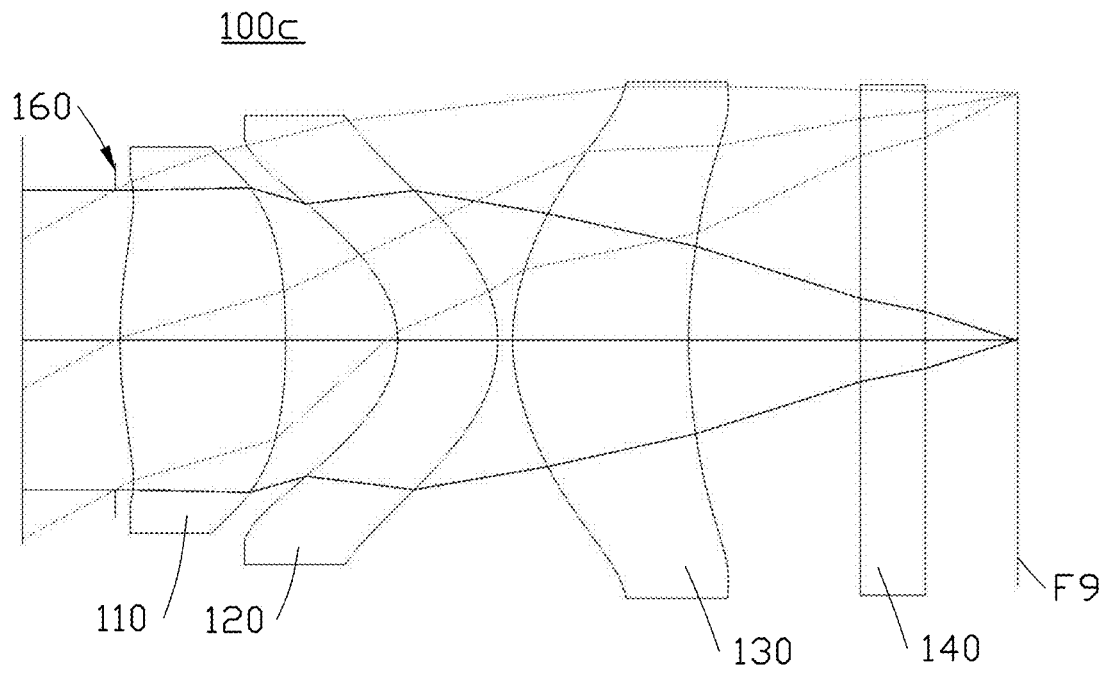
FIG. 5A is an illustration of an optical path of a third embodiment of an optical lens according to the present disclosure.

FIG. 5A shows an optical path of light with a wavelength of 940 nm passing through the optical lens 100c in the third embodiment.

Figure 5B:
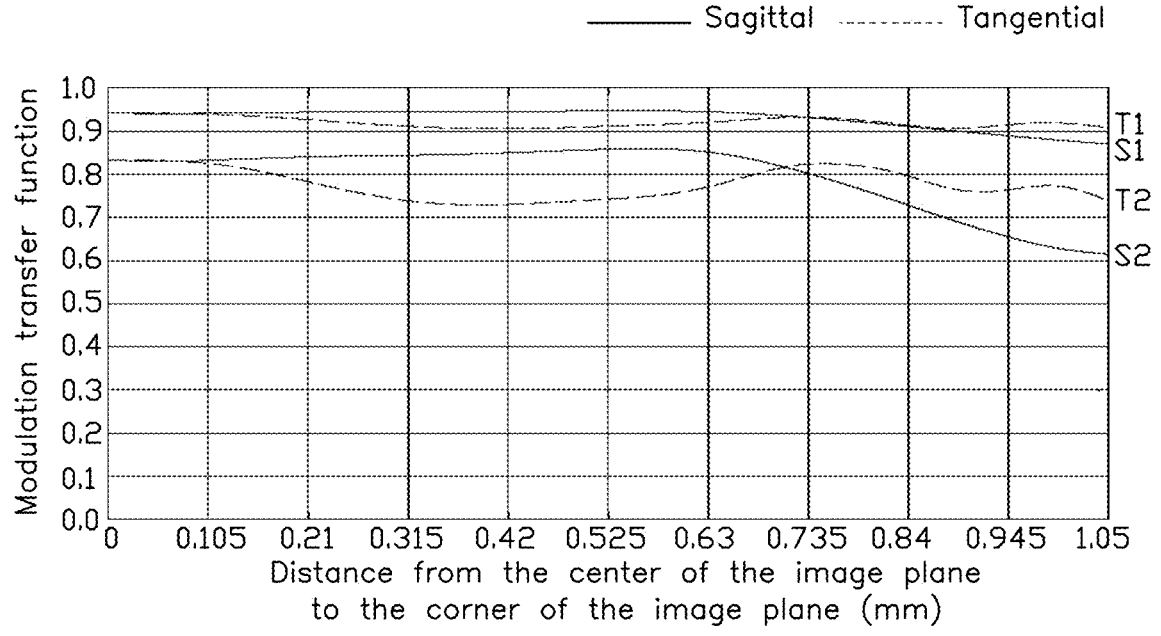
FIG. 5B is an illustration of a modulation transfer function of the optical lens shown in FIG. 5A.

FIG. 5B shows the modulation transfer function (MTF) of light with a wavelength from 920 nm to 960 nm after passing through the optical lens 100c in the third embodiment. As the distance from the center of the image plane to the corner of the image plane increases, a resolution and a contrast of the optical lens 100c changes slowly within a high value range, wherein curves T1 and S1 are close and curve T2 and S2 are close, which results in a good imaging effect.

Figure 5C:
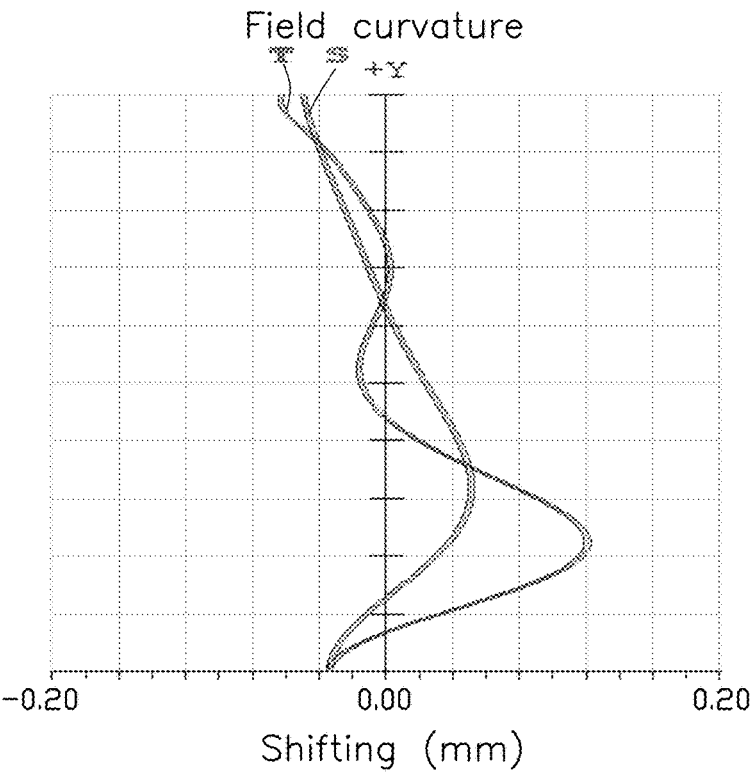
FIG. 5C is an illustration of a field curvature of the optical lens shown in FIG. 5A.

FIG. 5C shows the field curvature of light with wavelengths of 920 nm, 940 nm, and 960 nm incident at a ratio of 1:2:1 in light radiation intensity, passing through the optical lens 100b in the second embodiment. The field curve S is within 0.05 mm of a horizontal axis, and the field curve T is within 0.12 mm of a horizontal axis, which means the field curvature of a sagittal plane of the optical lens 100c is within 0.05 mm, and the field curvature of a tangent plane is within 0.12 mm, which has a good correction effect on the field curvature.

Figure 5D:
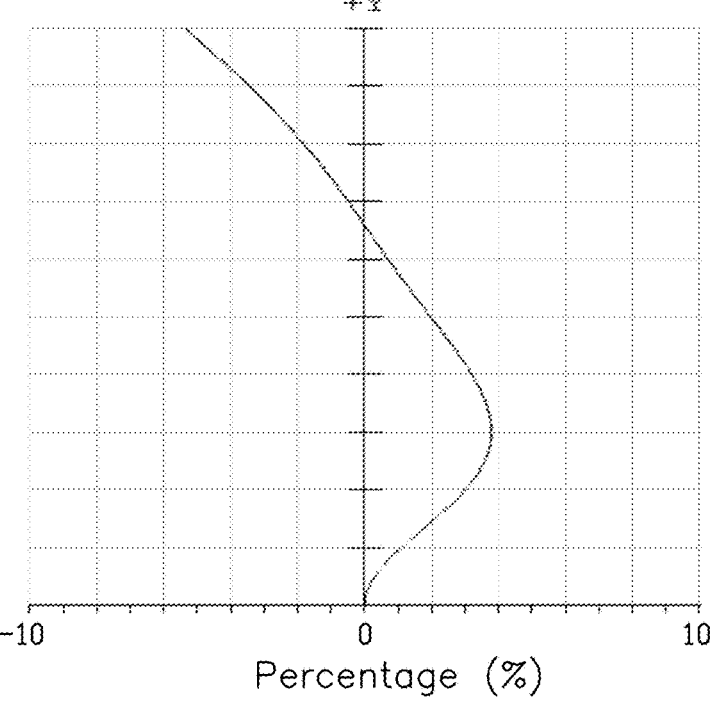
FIG. 5D is an illustration of a distortion of the optical lens shown in FIG. 5A.

FIG. 5D shows distortions of light with wavelengths of 920 nm, 940 nm, and 960 nm incident at a ratio of light radiation intensity of 1:2:1 after passing through the optical lens 100c in the third embodiment. The optical lens 100c meets a condition of −5.27%<DIS<3.6%, and has a good correction effect on distortion.

Figure 5E:
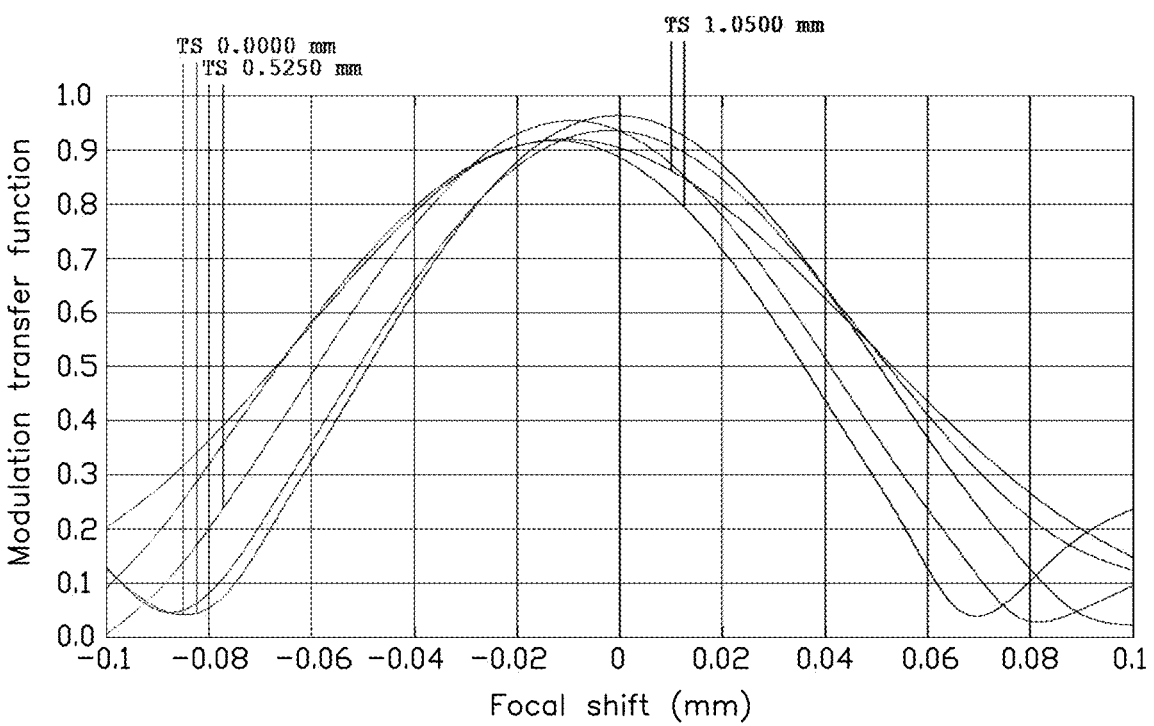
FIG. 5E is an illustration of a focal shift of the optical lens shown in FIG. 5A.

FIG. 5E shows the defocusing of light with wavelengths ranging from 920 nm to 960 nm after passing through the optical lens 100c in the third embodiment. When a distance between the front and back deviation of the image plane is 0 mm, 0.525 mm, and 1.05 mm respectively, the peak values of the corresponding defocusing curves TS are all at a higher position, and the MTF peak values remain greater than 0.90, wherein the optical lens 100c can achieve good imaging results.

Figure 5F:
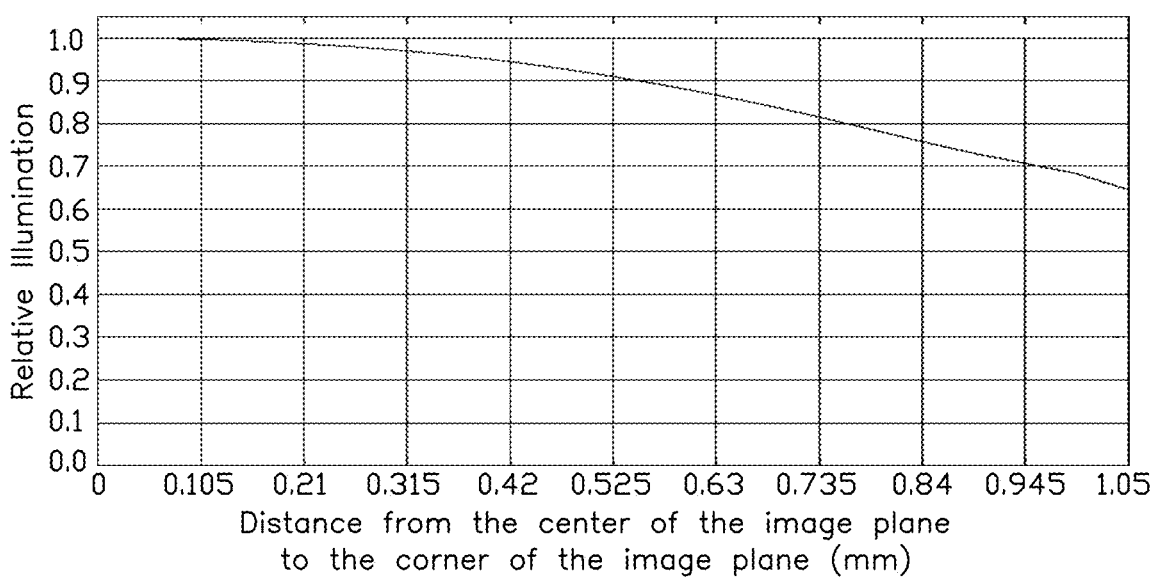
FIG. 5F is an illustration of a relative illumination of the optical lens shown in FIG. 5A.

FIG. 5F shows the relative illumination of light with a wavelength of 940 nm after passing through the optical lens 100c in the third embodiment. The optical lens 100c meets a condition of RI>67% and has high relative illumination, which is conducive to clearer imaging.

Figure 5G:
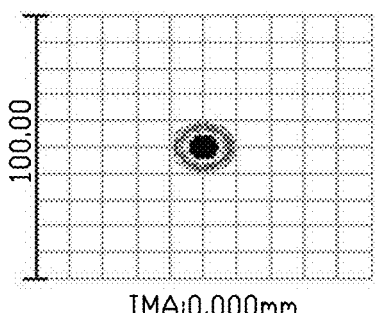
FIG. 5G is an illustration of a spot diagram of the optical lens shown in FIG. 5A.
Figure 5G:
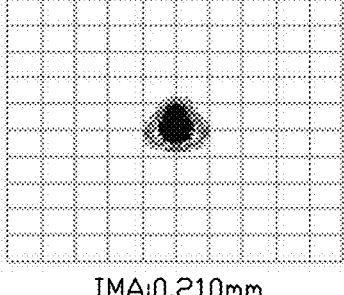
Figure 5G:
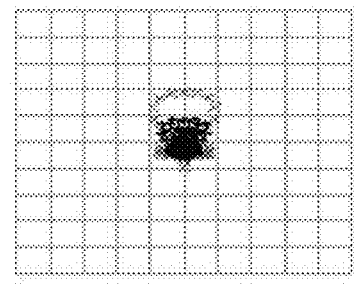
Figure 5G:
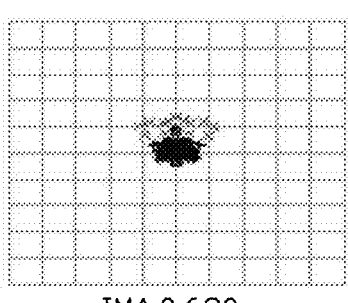
Figure 5G:
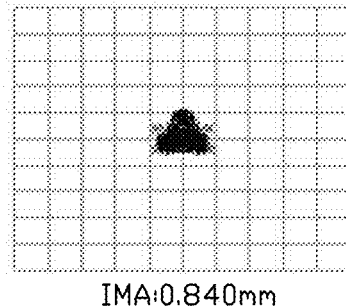
Figure 5G:
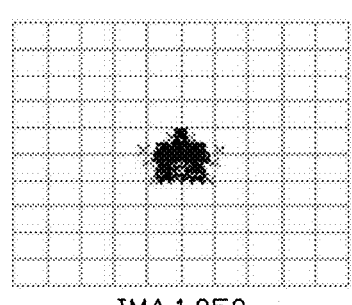

FIG. 5G is a spot diagram of light with wavelengths of 920 nm, 940 nm, and 960 nm incident at a ratio of 1:2:1 in light radiation intensity, passing through the optical lens 100c in the third embodiment. Values of image heights corresponding to different intersection of main light and the image surface IMA are 0.000 mm, 0.210 mm, 0.420 mm, 0.630 mm, 0.840 mm, and 1.050 mm, respectively. As the values increase, density of image spots in the spot diagram reduces from a center to an edge of the spot diagram. Moreover, the corresponding root mean square radius are 3.265 μm, 4.533 μm, 5.345 μm, 4.500 μm, 4.597 μm, and 5.323 μm, and the corresponding geometric (maximum) radius are 7.731 μm, 11.193 μm, 19.114 μm, 15.091 μm, 9.353 μm, and 12.674 μm. In the spot diagrams, the smaller the root mean square radius value (μm) and the geometric (maximum) radius (μm), the greater the density of the image spots, and the closer of the image spots to a central image spot corresponding to the main light, which indicates better imaging quality.

The optical lens 100 (100a, 100b, 100c) provided in this embodiment of the present disclosure includes three aspherical lenses. By adjusting optical and structural parameters of each component as shown in the tables 1 to 9, the optical lens 100 (100a, 100b, 100c) has a characteristics of a large aperture, and the aperture value meets the condition of 1.0≤Fno≤1.3, which can solve a defect of insufficient incident light, thereby increasing the incident light and improving an imaging quality and an imaging speed. Moreover, the optical lens 100 (100a, 100b, 100c) can get higher relative illumination, wider field angle, lower distortion, and space saving by adjusting the optical and structural parameters of each component shown in the tables 1 to 9.

Figure 6:
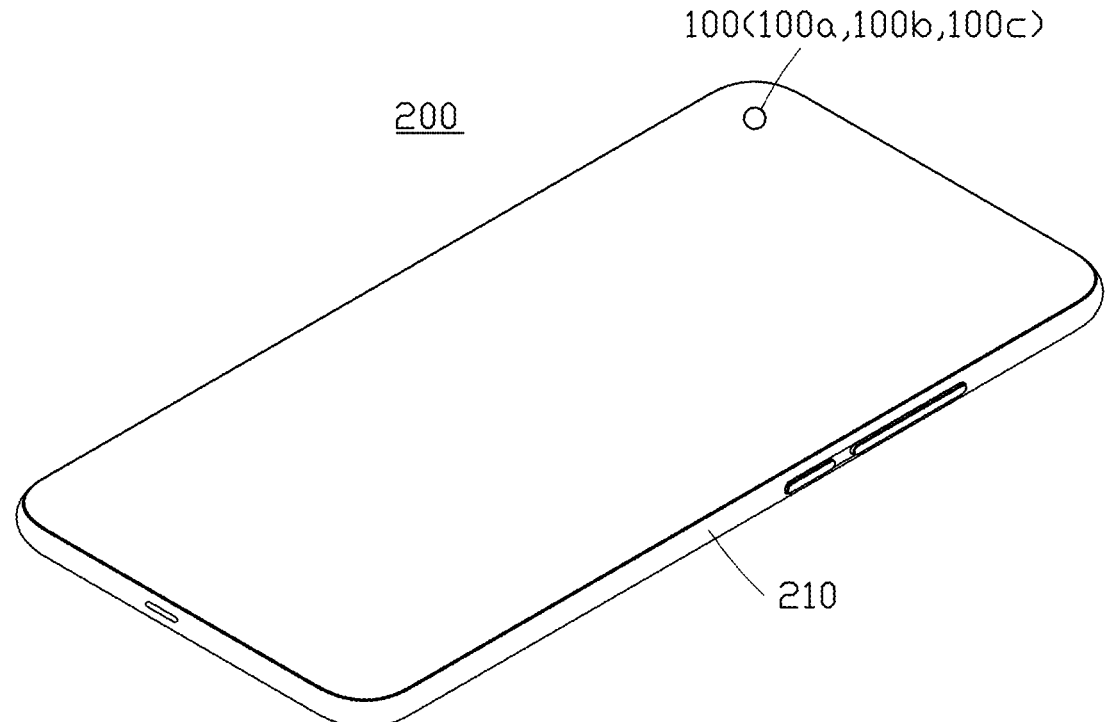
FIG. 6 is an schematic diagram of an embodiment of an electronic device according to the present disclosure.

This embodiment of the present disclosure further provides an electronic product 200. Referring to FIG. 6, the electronic product 200 includes the optical lens 100 (100a, 100b, 100c) and a housing 210. The electronic product 200 can be an industrial product with camera or imaging functions, such as a mobile phone, a tablet, a laptop, a camera, a recorder, or other form of device with camera or imaging functions, wherein the optical lens 100 (100a, 100b, 100c) is a key component that affects imaging speed and imaging quality. This embodiment takes the electronic product 200 as a mobile phone as an embodiment to describe structures and functions of the electronic product 200. The electronic product 200 can be used to capture external videos or photos and can be used to capture scenes at different distances. For embodiment, the electronic product 200 can be used to capture distant scenes, close up scenes, and macro scenes. Moreover, the electronic product 200 can include more than one optical lens 100 (100a, 100b, 100c). For embodiment, the electronic product 200 includes two optical lenses 100 (100a, 100b, 100c), wherein the two optical lenses 100 (100a, 100b, 100c) are both on a front surface of the electronic product 200, the two optical lenses 100 (100a, 100b, 100c) are both on a back surface of the electronic product 200, or one optical lenses 100 (100a, 100b, 100c) is on the front surface for pre-shooting and one optical lenses 100 (100a, 100b, 100c) is on the back surface for post shooting.

The electronic product 200 provided in this embodiment of the present disclosure utilizes optical lenses 100 (100a, 100b, 100c) to gather the incident light and to image, which improves an imaging speed and quality of the electronic product 200 by applying the performance advantage of large aperture of the optical lenses 100 (100$a$, 100$b$, 100$c$). Furthermore, the electronic product 200 can reduce a power consumption due to sufficient input light provided by the optical lens 100 (100$a$, 100$b$, 100$c$) when imaging.

The embodiments shown and described above are only examples. Many details are often found in the art such as the other features of a light-emitting assembly and a display device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An optical lens comprising a first lens; a second lens; and a third lens sequentially arranged along an optical axis of the optical lens from an object side to an image side of the optical lens, wherein:

the first lens has a positive focal power, at least part of an object surface of the first lens is a convex surface, an image surface of the first lens is a convex surface, the second lens has a negative focal power, at least part of an object surface of the second lens is a concave surface, an image surface of the second lens is a convex surface, the third lens has a positive focal power, at least part of an object surface of the third lens is a convex surface, an image surface of the third lens is a concave surface, and an aperture value of the optical lens satisfies a following condition: $1.0 \leq \text{Fno} \leq 1.3$, wherein Fno represents the aperture value of the optical lens.

2. The optical lens of claim 1, wherein each of the first lens, the second lens, and the third lens is an axisymmetric aspherical lens.

3. The optical lens of claim 1, wherein a focal length of the first lens is f1, a synthesis focal length of the second lens and the third lens is f23, and f1 and f23 satisfy following conditions: $0.38 < 1/\text{f1} < 0.40$, and $1.05 < \text{f1}/\text{f23} < 1.22$.

4. The optical lens of claim 1, wherein a maximum field angle of the optical lens is FOV and FOV satisfies a following condition: $70° \leq \text{FOV} \leq 72°$.

5. The optical lens of claim 1, wherein a relative illumination of the optical lens is RI and RI satisfies a following condition: $\text{RI} > 64\%$.

6. The optical lens of claim 1, wherein a center thickness of the first lens along the optical axis is CT1, an edge thickness of the first lens along the optical axis is ET1, a center thickness of the second lens on the optical axis along the optical axis is CT2, an edge thickness of the second lens along the optical axis is ET2, a center thickness of the third lens along the optical axis is CT3, an edge thickness of the third lens along the optical axis is ET3, and CT1, ET1, CT2, ET2, CT3, and ET3 satisfy following conditions: $2.00 < \text{CT1}/\text{ET1} < 2.40$, $1.00 < \text{CT2}/\text{ET2} < 1.30$, and $1.70 < \text{CT3}/\text{ET3} < 1.85$.

7. The optical lens of claim 1, wherein an effective focal length of the optical lens is EFL, an entrance pupil diameter of the optical lens is EPD, and EFL and EPD satisfy following conditions: $1.484 \leq \text{EFL} \leq 1.577$, and $1.272 \leq \text{EPD} \leq 1.428$.

8. The optical lens of claim 1, wherein a maximum image height of the optical lens is IH, an optical total length of the optical lens is OTL, and IH and OTL satisfy a following condition: $2.60 < \text{OTL}/\text{IH} < 2.77$.

9. The optical lens of claim 1, further comprising an image sensor on the image side, wherein the image sensor is configured to receive a light signal from the third lens and convert the light signal into an electric signal.

10. An electronic device comprising:

an optical lens comprising a first lens; a second lens; and a third lens sequentially arranged along an optical axis of the optical lens from an object side to an image side of the optical lens, wherein:

the first lens has a positive focal power, at least part of an object surface of the first lens is a convex surface, an image surface of the first lens is a convex surface;

the second lens has a negative focal power, at least part of an object surface of the second lens is a concave surface, an image surface of the second lens is a convex surface;

the third lens has a positive focal power, at least part of an object surface of the third lens is a convex surface, an image surface of the third lens is a concave surface; and an aperture value of the optical lens satisfies a following condition: $1.0 \leq \text{Fno} \leq 1.3$, wherein Fno represents the aperture value of the optical lens; and a shell with a surface capable of mounting the optical lens.

11. The electronic device of claim 10, wherein each of the first lens, the second lens, and the third lens is an axisymmetric aspherical lens.

12. The electronic device of claim 10, wherein a focal length of the first lens is f1, a synthesis focal length of the second lens and the third lens is f23, and f1 and f23 satisfy following conditions: $0.38 < 1/\text{f1} < 0.40$, and $1.05 < \text{f1}/\text{f23} < 1.22$.

13. The electronic device of claim 10, wherein a maximum field angle of the optical lens is FOV and FOV satisfies a following condition: $70° \leq \text{FOV} \leq 72°$.

14. The electronic device of claim 10, wherein a relative illumination of the optical lens is RI and RI satisfies a following condition: $\text{RI} > 64\%$.

15. The electronic device of claim 10, wherein a center thickness of the first lens along the optical axis is CT1, an edge thickness of the first lens along the optical axis is ET1, a center thickness of the second lens on the optical axis along the optical axis is CT2, an edge thickness of the second lens along the optical axis is ET2, a center thickness of the third lens along the optical axis is CT3, an edge thickness of the third lens along the optical axis is ET3, and CT1, ET1, CT2, ET2, CT3, and ET3 satisfy following conditions: $2.00 < \text{CT1}/\text{ET1} < 2.40$, $1.00 < \text{CT2}/\text{ET2} < 1.30$, and $1.70 < \text{CT3}/\text{ET3} < 1.85$.

16. The electronic device of claim 10, wherein an effective focal length of the optical lens is EFL, an entrance pupil diameter of the optical lens is EPD, and EFL and EPD satisfy following conditions: $1.484 \leq \text{EFL} \leq 1.577$, and $1.272 \leq \text{EPD} \leq 1.428$.

17. The electronic device of claim 10, wherein a maximum image height of the optical lens is IH, an optical total length of the optical lens is OTL, and IH and OTL satisfy a following condition: $2.60 < \text{OTL}/\text{IH} < 2.77$.

18. The electronic device of claim 10, wherein the optical lens further comprises an image sensor on the image side, wherein the image sensor is configured to receive a light signal from the third lens and convert the light signal into an electric signal.

* * * * *